US012335477B2

(12) United States Patent
Ahn et al.

(10) Patent No.: US 12,335,477 B2
(45) Date of Patent: Jun. 17, 2025

(54) NEURAL NETWORK FEATURE MAP QUANTIZATION METHOD AND DEVICE

(71) Applicant: INTELLECTUAL DISCOVERY CO., LTD., Seoul (KR)

(72) Inventors: Yongjo Ahn, Seoul (KR); Jongseok Lee, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 26 days.

(21) Appl. No.: 18/253,381

(22) PCT Filed: Nov. 18, 2021

(86) PCT No.: PCT/KR2021/016998
§ 371 (c)(1),
(2) Date: May 17, 2023

(87) PCT Pub. No.: WO2022/108361
PCT Pub. Date: May 27, 2022

(65) Prior Publication Data
US 2023/0421764 A1  Dec. 28, 2023

(30) Foreign Application Priority Data

Nov. 18, 2020 (KR) .................. 10-2020-0154765
Nov. 18, 2020 (KR) .................. 10-2020-0154766

(51) Int. Cl.
*H04N 19/124* (2014.01)
*G06V 10/74* (2022.01)
(Continued)

(52) U.S. Cl.
CPC ......... *H04N 19/124* (2014.11); *G06V 10/761* (2022.01); *G06V 10/764* (2022.01);
(Continued)

(58) Field of Classification Search
CPC .... H04N 19/124; H04N 19/136; H04N 19/42; G06V 10/7715; G06V 10/761; G06V 10/82; G06V 10/764
See application file for complete search history.

(56) References Cited

U.S. PATENT DOCUMENTS

2018/0150740 A1* 5/2018 Wang ................ G06V 40/168
2020/0143169 A1   5/2020 Vaezi Joze
(Continued)

FOREIGN PATENT DOCUMENTS

KR  10-2019-0014900 A  2/2019
KR  10-2019-0054454 A  5/2019
(Continued)

OTHER PUBLICATIONS

International Search Report for PCT/KR2021/016998 by Korean Intellectual Property Office dated Feb. 21, 2022.

*Primary Examiner* — James T Boylan
(74) *Attorney, Agent, or Firm* — BROADVIEW IP LAW, PC

(57) ABSTRACT

A neural network-based signal processing method and device according to the present invention generates a feature map by means of a multilayer neural network comprising a plurality of neural networks, and performs quantization for the feature map, the quantization performed on the basis of the structure of the multilayer neural network or the attribute of the feature map.

9 Claims, 17 Drawing Sheets

(51) Int. Cl.
*G06V 10/764* (2022.01)
*G06V 10/77* (2022.01)
*G06V 10/82* (2022.01)
*H04N 19/136* (2014.01)
*H04N 19/42* (2014.01)

(52) U.S. Cl.
CPC .......... *G06V 10/7715* (2022.01); *G06V 10/82* (2022.01); *H04N 19/136* (2014.11); *H04N 19/42* (2014.11)

(56) References Cited

U.S. PATENT DOCUMENTS

2022/0121937 A1* 4/2022 Su .......................... G06N 3/10
2022/0414432 A1* 12/2022 Banitalebi Dehkordi ................... G06N 3/048
2024/0242481 A1* 7/2024 Rosewarne .......... G06V 10/771

FOREIGN PATENT DOCUMENTS

KR  10-2019-0125141 A  11/2019
KR  10-2020-0110613 A  9/2020

* cited by examiner

Uniform distribution

NEURAL NETWORK FEATURE MAP QUANTIZATION METHOD AND DEVICE

CROSS-REFERENCE TO RELATED APPLICATIONS

This application is a National Phase Entry Application of PCT Application No. PCT/KR2021/016998, filed on Nov. 18, 2021, which claims priority to Korean Patent Application No. 10-2020-0154765, filed on Nov. 18, 2020, and Korean Patent Application No. 10-2020-0154766, filed on Nov. 18, 2020, in Korean Intellectual Property Office, the entire contents of which are hereby incorporated by reference in its entirety.

TECHNICAL FIELD

The present disclosure relates to a neural network feature map quantization method and device. Specifically, the present disclosure relates to a neural network feature map quantization method and device using a neural network structure. In addition, the present disclosure relates to a neural network feature map quantization method and device using feature map classification.

BACKGROUND ART

A video image is compressed and coded by removing temporal and spatial redundancy and inter-view redundancy, which may be transmitted through a communication line or stored in a form suitable for a storage medium.

DISCLOSURE

Technical Problem

The present disclosure is to improve coding efficiency of a video signal through efficient neural network feature map quantization.

Technical Solution

A neural network-based signal processing method and device according to the present disclosure may generate a feature map by using multiple neural networks including a plurality of neural networks and perform quantization on the feature map.

In a neural network-based signal processing method and device according to the present disclosure, the quantization may be performed based on an attribute of the feature map or a structure of the multiple neural networks.

In a neural network-based signal processing method and device according to the present disclosure, an attribute of the feature map may include a distribution type of sample values in the feature map.

In a neural network-based signal processing method and device according to the present disclosure, the quantization may be performed by a quantization method mapped to the distribution type.

In a neural network-based signal processing method and device according to the present invention, the distribution type may include at least one of uniform distribution, Gaussian distribution or Laplace distribution.

In a neural network-based signal processing method and device according to the present disclosure, performing the quantization may include performing normalization for sample values in the feature map by a normalization method mapped to the distribution type.

In a neural network-based signal processing method and device according to the present disclosure, a structure of the multiple neural networks may include at least one of whether the multiple neural networks are connected in series, whether the multiple neural networks are connected in parallel, whether the multiple neural networks are connected in series and in parallel or a type of a layer adjacent to a current layer that the feature map is generated.

In a neural network-based signal processing method and device according to the present disclosure, the quantization may be performed by a quantization method mapped to a type of the adjacent layer and a type of the layer may include at least one of a batch normalization layer or a summation layer.

In a neural network-based signal processing method and device according to the present disclosure, classifying the feature map into a plurality of classes may be further included and an attribute of the feature map may include a class of the feature map.

In a neural network-based signal processing method and device according to the present disclosure, the feature map may include a plurality of channels.

In a neural network-based signal processing method and device according to the present disclosure, the feature map may be classified into the plurality of classes including at least one channel based on a similarity between the plurality of channels.

In a neural network-based signal processing method and device according to the present disclosure, the feature map may be spatially classified based on a spatial similarity of an input image.

Technical Effects

According to an embodiment of the present disclosure, coding efficiency of a video signal may be improved. In addition, according to an embodiment of the present disclosure, video signal coding efficiency may be improved through neural network feature map quantization using a neural network structure. In addition, according to an embodiment of the present disclosure, video signal coding efficiency may be improved through neural network feature map quantization using feature map classification.

DESCRIPTION OF DIAGRAMS

BEST MODE

Figure 1:
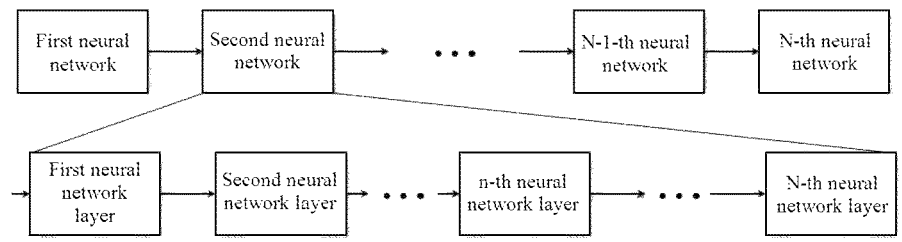
FIG. 1 is a diagram showing a layer structure of multiple neural networks according to an embodiment of the present disclosure.

A neural network-based signal processing method and device according to the present disclosure may generate a feature map by using multiple neural networks including a plurality of neural networks and perform quantization for the feature map.

In a neural network-based signal processing method and device according to the present disclosure, the quantization may be performed based on an attribute of the feature map or a structure of the multiple neural networks.

In a neural network-based signal processing method and device according to the present disclosure, an attribute of the feature map may include a distribution type of sample values in the feature map.

In a neural network-based signal processing method and device according to the present disclosure, the quantization may be performed by a quantization method mapped to the distribution type.

In a neural network-based signal processing method and device according to the present disclosure, the distribution type may include at least one of uniform distribution, Gaussian distribution or Laplace distribution.

In a neural network-based signal processing method and device according to the present disclosure, performing the quantization may include performing normalization for sample values in the feature map by a normalization method mapped to the distribution type.

In a neural network-based signal processing method and device according to the present disclosure, a structure of the multiple neural networks may include at least one of whether the multiple neural networks are connected in series, whether the multiple neural networks are connected in parallel, whether the multiple neural networks are connected in series and in parallel or a type of a layer adjacent to a current layer that the feature map is generated.

In a neural network-based signal processing method and device according to the present disclosure, the quantization may be performed by a quantization method mapped to a type of the adjacent layer and a type of the layer may include at least one of a batch normalization layer or a summation layer.

In a neural network-based signal processing method and device according to the present disclosure, classifying the feature map into a plurality of classes may be further included and an attribute of the feature map may include a class of the feature map.

In a neural network-based signal processing method and device according to the present disclosure, the feature map may include a plurality of channels.

In a neural network-based signal processing method and device according to the present disclosure, the feature map may be classified into the plurality of classes including at least one channel based on a similarity between the plurality of channels.

In a neural network-based signal processing method and device according to the present disclosure, the feature map may be spatially classified based on a spatial similarity of an input image.

Mode

An embodiment of the present disclosure will be described in detail so that those skilled in the art can easily implement it by referring to a drawing attached to this specification. But, the present disclosure may be implemented in different forms and it is not limited to an embodiment described herein. And, a part irrelevant to a description is omitted to clearly describe the present disclosure in a drawing and a similar reference numeral is attached to a similar part throughout this specification.

Throughout this specification, when a part is referred to as being 'connected' to other part, it may include an electrical connection that other element presents therebetween as well as a direct connection.

In addition, when a part is referred to as 'including' a component throughout this specification, it means other component may be further included without excluding other component unless otherwise opposed.

In addition, a term such as first, second, etc. may be used to describe a variety of components, but the components should not be limited by the terms. The terms are used only to distinguish one component from other component.

In addition, for an embodiment about a device and a method described in this specification, some configurations of a device or some steps of a method may be omitted. In addition, order of some configurations of a device or some steps of a method may be changed. In addition, other configuration or other step may be inserted into some configurations of a device or some steps of a method.

In addition, some configurations or some steps of a first embodiment of the present disclosure may be added to a second embodiment of the present disclosure or may substitute some configurations or some steps of a second embodiment.

In addition, construction units shown in an embodiment of the present disclosure are independently shown to represent different characteristic functions, and they do not mean that each construction unit is configured with separated hardware or one software construction unit. In other words, each construction unit is described by being enumerated as each construction unit for convenience of a description and at least two construction units of each construction unit may be combined to form one construction unit or one construction unit may be partitioned into a plurality of construction units to perform a function. An integrated embodiment and separated embodiment of each construction unit are also included in a scope of a right of the present disclosure unless they are departing from the spirit of the present disclosure.

First, terms used in this application may be briefly described as follows.

A decoding device (Video Decoding Apparatus) to be described later may be a device included in a server terminal such as a civil security camera, a civil security system, a military security camera, a military security system, a personal computer (PC), a notebook computer, a portable multimedia player (PMP), a wireless communication terminal, a smart phone, a TV application server and a service server, etc. and it may mean a variety of devices equipped with a user terminal including equipment of every kind, a communication device including a communication modem, etc. for communication with a wired/wireless communication network, a memory for storing various kinds of programs and data for decoding an image or performing intra or inter prediction for decoding, a microprocessor for executing a program and performing operation and control and others.

In addition, an image encoded as a bitstream by an encoder may be transmitted to an image decoding device, decoded and reconstructed and reproduced as an image through a variety of communication interface such as a cable, an universal serial bus (USB), etc. or through a wired or wireless communication network, etc. such as the Internet, a wireless local area network, a wireless LAN network, a Wi-Bro network, a mobile communication network, etc. in real time or in non-real time. Alternatively, a bitstream generated by an encoder may be stored in a memory. The memory may include both a volatile memory and a non-volatile memory. In this specification, a memory may be expressed as a recoding medium storing a bitstream.

Commonly, a video may be configured with a series of pictures and each picture may be partitioned into coding units like a block. In addition, a person with ordinary skill in the art to which this embodiment pertains may understand that a term of picture entered below may be used by being substituted with other term having the same meaning as an image, a frame, etc. And, a person with ordinary skill in the art to which this embodiment pertains may understand that a term of coding unit may be used by being substituted with other term having the same meaning as a unit block, a block, etc.

Hereinafter, in reference to attached drawings, an embodiment of the present disclosure is described in more detail. In describing the present disclosure, an overlapping description is omitted for the same component.

An embodiment of the present disclosure proposes a method and a device of compressing a feature map which is a result (or an interim result) of a neural network and in more detail, a method and a device of using information of a neural network structure in compressing a feature map.

As an embodiment of the present disclosure, in compressing a feature map by using information of a neural network structure, a method and a device of using a plurality of different quantizers are provided.

In addition, as an embodiment of the present disclosure, in compressing a feature map, an encoding and decoding method and device of analyzing a structural feature of a neural network and selectively using a different quantizer or dequantizer according to the analyzed feature to improve compression performance are provided.

A characteristic of a feature map may be considered by using a quantization method or a dequantization method proposed in the present disclosure. By analyzing/reflecting a characteristic of a feature map and selectively using a quantization and dequantization method suitable for a corresponding characteristic, it is possible to reduce a quantization error and improve quantization efficiency compared to using a single quantization method.

FIG. 1 is a diagram showing a layer structure of multiple neural networks according to an embodiment of the present disclosure.

In reference to FIG. 1, a neural network according to this embodiment may have a neural network structure configured with multiple neural networks (i.e., a plurality of neural networks). And, each neural network in multiple neural networks may include multiple neural network layers.

As an embodiment, between one neural network and a neural network adjacent to it, data expressed in various forms such as a scalar value, a vector, a tensor, an image, a video, a bitstream, etc. may be transmitted. An example, the data may be transmitted in a form of a tensor, three-dimensional data, between adjacent neural networks.

As shown in FIG. 1, each neural network in multiple neural networks may be configured with a plurality of layers for performing a function of a neural network. In this specification, a neural network may refer to all multiple neural networks including a plurality of neural networks, refer to one neural network of multiple neural networks or refer to all or part of a neural network layer included in a neural network.

Figure 2:
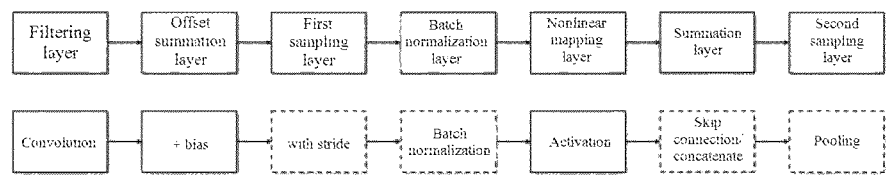
FIG. 2 is a diagram showing an example of a neural network layer structure according to an embodiment of the present disclosure.

FIG. 2 is a diagram showing an example of a neural network layer structure according to an embodiment of the present disclosure.

In reference to FIG. 2, one neural network layer may include at least one layer of a filtering layer, an offset summation layer, a first sampling layer, a batch normalization layer, a nonlinear mapping layer, a summation layer, a second sampling layer. For a neural network layer shown in FIG. 2, as an example, order of layers may be different from that in a picture.

As an embodiment, a convolution operation may be performed in a filtering layer. In this case, a filter used for convolution may be a filter having a size of various dimensions such as one dimension, two dimensions, three dimensions, etc. In addition, a predetermined offset value may be summed in an offset summation layer. In this case, the same number of offset values as the number of filters used in a filtering layer may be summed. Alternatively, data may be transmitted to a next-priority layer without the offset summation layer.

In addition, sampling may be performed at a predetermined sampling ratio for offset-summed data in a first sampling layer. Sampling may be performed for all data that convolution and an offset are summed and in order to reduce computational complexity, a position of data that convolution and an offset are summed may be sampled first and convolution and offset summation may be performed only at a corresponding position. Subsequently, batch normalization may be performed in a batch normalization layer. Batch normalization may normalize a feature map by using an average and/or a variance value. In this case, an average and/or a variance value may be a value learned in a learning process.

In addition, a feature map may be mapped by a nonlinear mapping function in a nonlinear mapping layer. For example, a variety of nonlinear functions such as a ReLU (Rectified Linear Unit), Leak ReLU (Leaky ReLU), sigmoid, tanh (Hyperbolic Tangent), etc. may be used as a nonlinear mapping function. In a summation layer, a feature map generated in a current or previous layer and a predetermined other feature map may be summed. In this case, other feature map may be one of feature maps generated before. In addition, the summation may mean addition. Alternatively, the summation may mean a combination in which data is connected in a specific dimension.

In addition, a current feature map may be spatially downsampled in a second sampling layer. In this case, a variety of downsampling methods such as max pooling which performs sampling with a largest value within a specific scope, average pooling which performs sampling with an average value, median pooling which performs sampling with a median value, DCT pooling using DCT, etc. may be used as a downsampling method.

Figure 3:
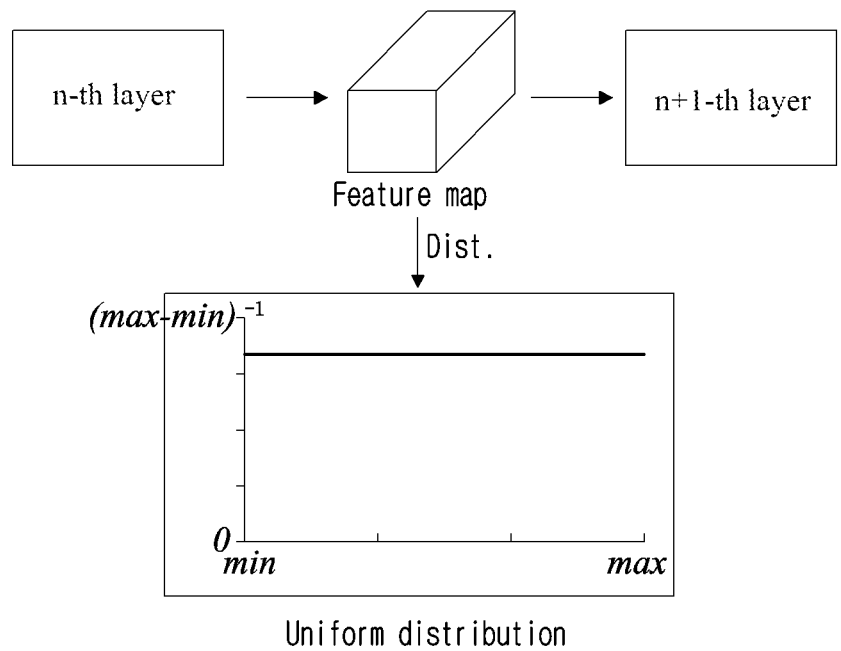
FIG. 3 is a diagram illustrating a case in which a characteristic of a feature map is uniform distribution as an embodiment of the present disclosure.

FIG. 3 is a diagram illustrating a case in which a characteristic of a feature map is uniform distribution as an embodiment of the present disclosure.

According to an embodiment of the present disclosure, quantization for a feature map may be performed by considering a characteristic of a feature map. A feature map may be output of a neural network layer or a neural network. A characteristic of a feature map may be a distribution characteristic of values of a feature map. The value may be a value of a pixel, a sample or a coefficient of a feature map. A quantization method corresponding to a characteristic of a feature map may be predefined.

In reference to FIG. 3, distribution of values of a feature map output from any one layer (referred to as a n-th layer) among layers of multiple neural networks may be uniform distribution. When distribution of a feature map is uniform distribution, it may be a case in which a function of a current neural network performs a function of generating or predicting a noise of uniform distribution.

As an embodiment, for quantization of a feature map, when a characteristic of a feature map is uniform distribution, quantization suitable for uniform distribution may be applied. In this case, when quantization suitable for uniform distribution is applied to a corresponding feature map, dequantization suitable for uniform distribution may be also applied equally to dequantization therefor.

Figure 4:
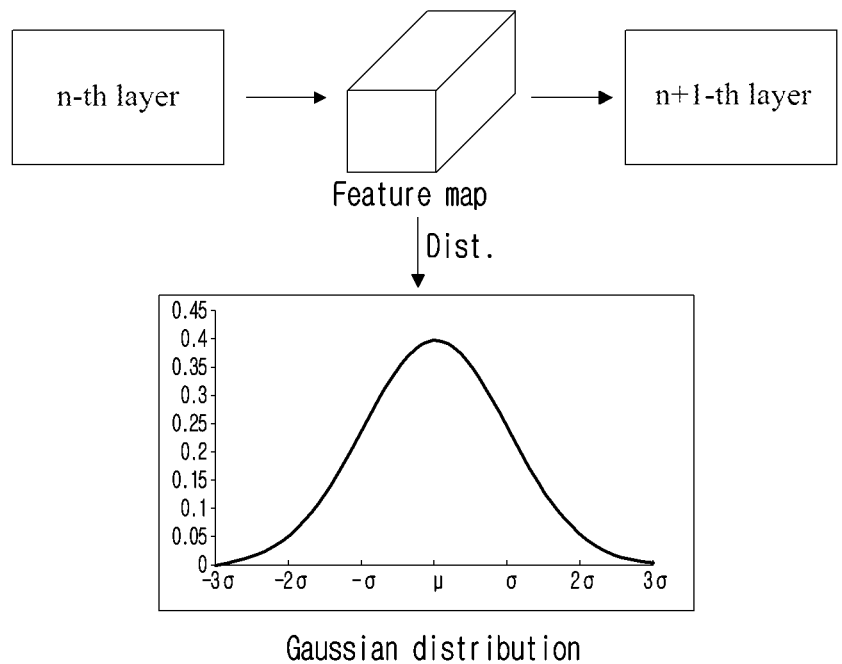
FIG. 4 is a diagram illustrating a case in which a characteristic of a feature map is Gaussian distribution as an embodiment of the present disclosure.

FIG. 4 is a diagram illustrating a case in which a characteristic of a feature map is Gaussian distribution as an embodiment of the present disclosure.

In reference to FIG. 4, distribution of values of a feature map output in a n-th layer among layers of multiple neural networks may be Gaussian distribution. It is a graph showing Gaussian distribution that an average is $\mu$ and variance is 6 as one embodiment. Generally, when learning with a large amount of data, distribution of a feature map is similar to distribution of data and general data may mostly follow Gaussian distribution.

As an embodiment, for quantization of a feature map, when a characteristic of a feature map is Gaussian distribution, quantization suitable for Gaussian distribution may be applied. In this case, when quantization suitable for Gaussian distribution is applied to a corresponding feature map, dequantization suitable for Gaussian distribution may be also applied equally to dequantization therefor.

Figure 5:
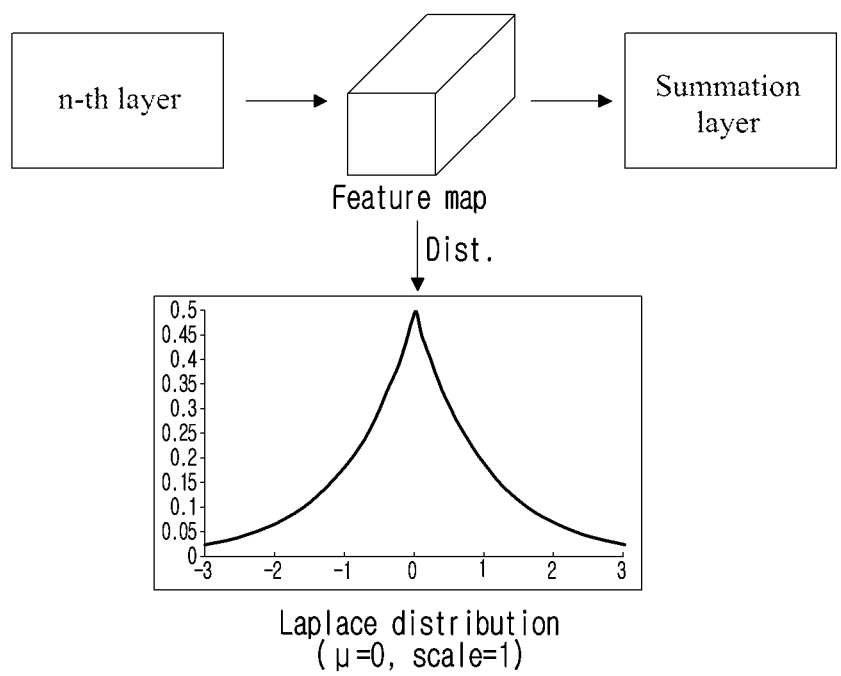
FIG. 5 is a diagram illustrating a case in which a characteristic of a feature map is Laplace distribution as an embodiment of the present disclosure.

FIG. 5 is a diagram illustrating a case in which a characteristic of a feature map is Laplace distribution as an embodiment of the present disclosure.

In reference to FIG. 5, distribution of values of a feature map output in a n-th layer among layers of multiple neural networks may be Laplace distribution.

In particular, when a next layer is a summation layer, distribution of a feature map may be Laplace distribution. Generally, when a next layer is a summation layer, a feature map generated in a current layer may be at least one of a high frequency component signal, a differential signal or a detail signal of a feature map generated in a previous layer. The signal may generally show Laplace distribution with an average of 0. In other words, when a next layer is a summation layer, a currently generated feature map may be generally Laplace distribution.

As an embodiment, for quantization of a feature map, when a characteristic of a feature map is Laplace distribution, quantization suitable for Laplace distribution may be applied. In this case, when quantization suitable for Laplace distribution is applied to a corresponding feature map, dequantization suitable for Laplace distribution may be also applied equally to dequantization therefor.

Figure 6:
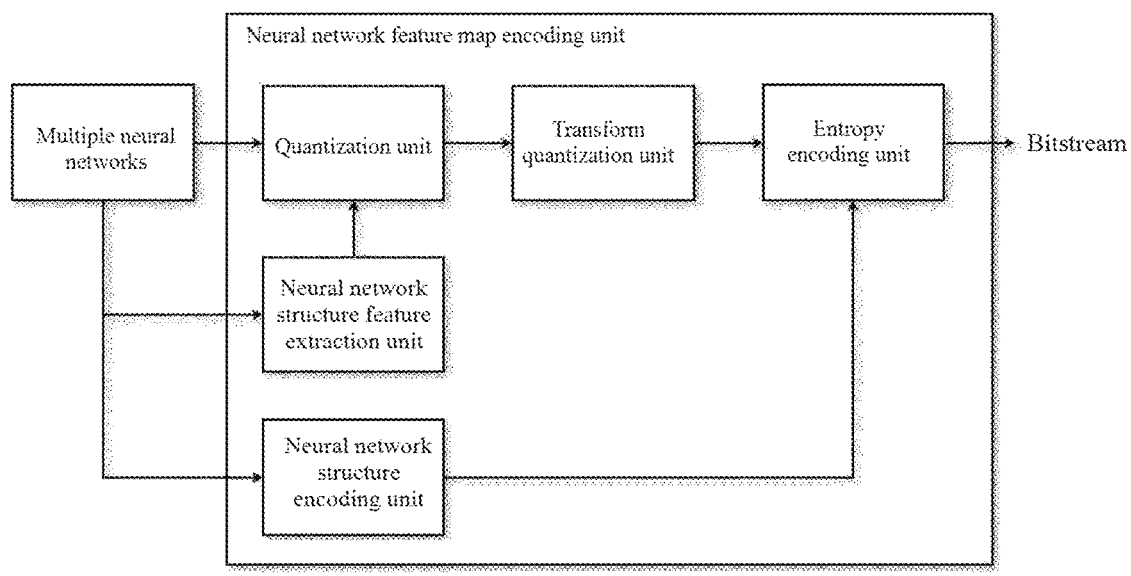
FIG. 6 shows a neural network feature map encoding unit encoding a feature map of a neural network as an embodiment of the present disclosure.

FIG. 6 shows a neural network feature map encoding unit encoding a feature map of a neural network as an embodiment of the present disclosure.

In reference to FIG. 6, a neural network feature map encoding unit may encode a feature map of a neural network generated from multiple neural networks. As an example, a neural network feature map encoding unit may include a quantization unit, a transform quantization unit (or a transform unit), an entropy encoding unit, a neural network structure feature extraction unit, a neural network structure encoding unit. A configuration of a neural network feature map encoding unit shown in FIG. 6, as an example, may be implemented to omit some configurations or further include other configurations.

Multiple neural networks may be configured with a plurality of neural networks and each neural network may be connected in series or in parallel. Alternatively, for one data, some of multiple neural network structures may be connected in series and others may be connected in parallel. A feature map, an interim result (or output), may be generated in a consecutive neural network connection.

When a neural network is connected in series, one feature map may be generated. And, when a neural network is connected in parallel, one or more feature maps may be generated. The plurality of feature maps may have the same size or a different size, respectively.

As an embodiment, at least one feature map, a result (or an interim result) of multiple neural networks, may be compressed through a neural network feature encoding unit and transmitted to a decoding unit or stored in a storage device. A quantization unit may quantize an input feature map. An example, a feature map (or a pixel value in a feature map) may be a value expressed as a floating point. In this case, it may be transformed into an integer which may be expressed as a bit depth supported by an encoding unit. If values of a feature map is an integer type, values of a feature map may be mapped to a scope which may be expressed as a bit depth supported by an encoding unit.

In a process of performing quantization, a structural feature of a neural network that a feature map is generated may be received from a neural network structure feature extraction unit and a different quantization method may be selectively or adaptively used according to a feature. And, a quantized feature map may be input to a transform quantization unit. The transform quantization unit may be referred to as a transform unit. A neural network structure feature extraction unit may analyze a structure of multiple neural networks, extract a feature and transmit it to a quantization unit.

In this case, the feature may be a type of a neural network layer that a feature map to be currently encoded is generated and a next neural network layer. Alternatively, the feature may be a position of a layer like order of a neural network layer that a current neural network is generated among all multiple neural networks. Alternatively, the feature may be index information of a parallel connection and a position for order of parallel connections when a neural network is connected in parallel.

A transform quantization unit may transform and quantize an input feature map for encoding and transmit it to an entropy encoding unit. In this case, for transform, spatial transform for transforming spatially high-dimensional data into low-dimensional data may be performed. Here, quantization in transform quantization may mean quantization for rate control.

Generally, a feature map may be three-dimensional data and a length along an axis of each dimension may be expressed as a width, a height, a depth, or a channel. Alternatively, a feature map may be transformed into two-dimensional data like an image by connecting all channels of a feature map into one channel. And, transformed two-dimensional data may be transformed and quantized through a method of encoding the existing image or video. Alternatively, frequency transform such as DCT, DST may be performed for a feature map and quantization according to a frequency may be performed in a frequency domain.

A neural network structure encoding unit may perform symbolization to receive and encode information on all or part of neural network structures from multiple neural networks and a symbolized neural network structure may be transmitted to an entropy encoding unit. An entropy encoding unit may receive and entropy-encode an input transform-quantized feature map and neural network structure to generate a bitstream.

Figure 7:
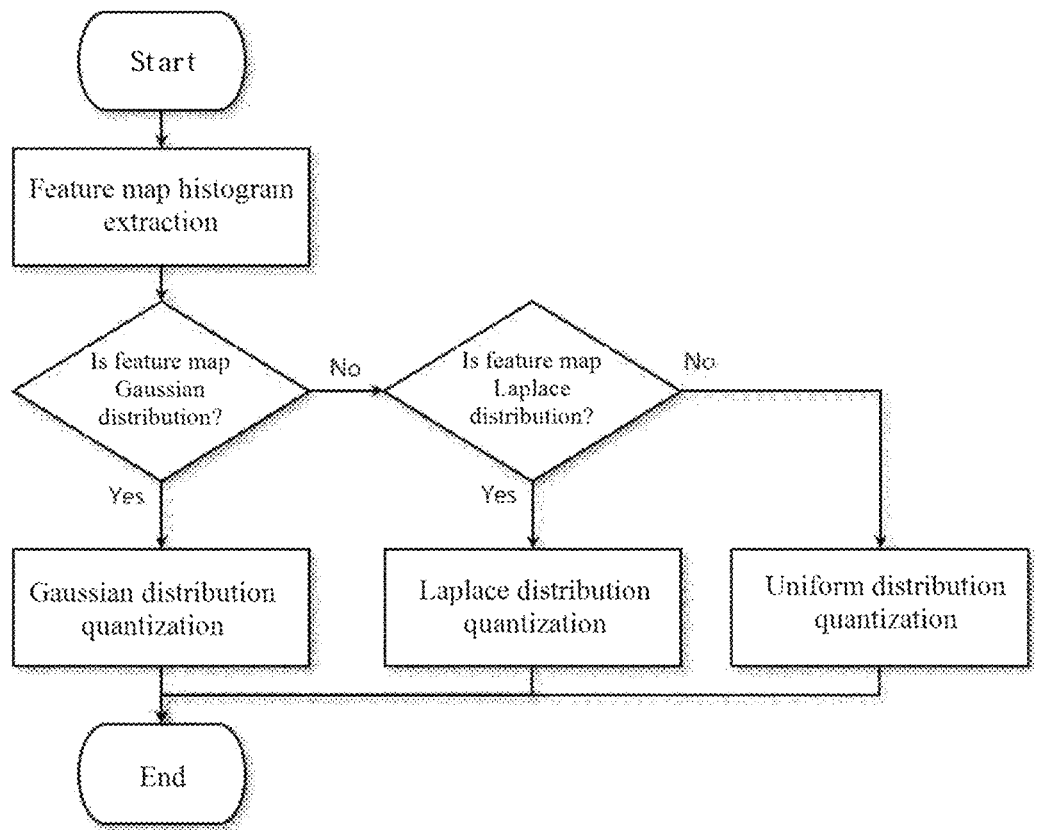
FIG. 7 is a diagram showing a quantization flowchart of a feature map according to an embodiment of the present disclosure.

FIG. 7 is a diagram showing a quantization flowchart of a feature map according to an embodiment of the present disclosure.

This embodiment described by referring to FIG. 7 may be an example of a process performed in a quantization unit. For example, this embodiment may be performed in a quantization unit of a neural network feature map encoding unit described above in FIG. 6.

According to an embodiment of the present disclosure, a quantization unit may use all values of a feature map to extract (or acquire) a histogram (or a feature). A quantization unit may confirm whether distribution of an extracted histogram is Gaussian distribution. Here, information on whether it is Gaussian distribution may be transmitted to a decoder through an entropy encoding unit.

When confirming whether to follow Gaussian distribution, similarity with a Gaussian function obtained through an average and variance of a feature map may be measured to make a decision with that similarity. If Gaussian distribution is followed, Gaussian distribution quantization may be performed. Otherwise, a quantization unit may confirm whether to follow Laplace distribution.

And, information on whether to follow Laplace distribution may be transmitted to a decoder through an entropy encoding unit. Here, when confirming whether to follow Laplace distribution, similarity between distribution of a feature map and a Laplace function made by using an average and variance of a feature map may be measured to make a decision based on that similarity. If it is determined that Laplace distribution is followed, Laplace distribution quantization may be performed and for the opposite case, uniform distribution quantization may be performed.

Figure 8:
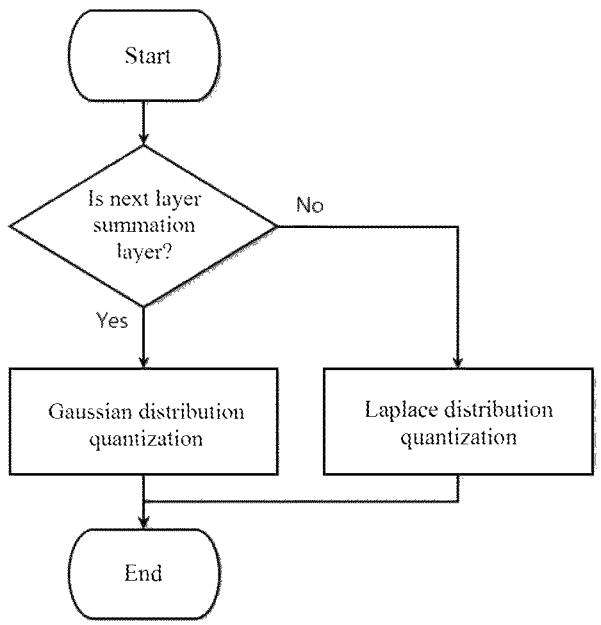
FIG. 8 is a diagram showing a quantization flowchart of a feature map according to an embodiment of the present disclosure.

FIG. 8 is a diagram showing a quantization flowchart of a feature map according to an embodiment of the present disclosure.

This embodiment described by referring to FIG. 8 may be an example of a process performed in a quantization unit. For example, this embodiment may be performed in a quantization unit of a neural network feature map encoding unit described above in FIG. 6.

A quantization unit may confirm whether a next layer is a summation layer through a neural network feature transmitted from a neural network structure feature extraction unit. For a summation layer, Laplace distribution quantization may be performed. Conversely, for a layer other than a summation layer, Gaussian distribution quantization may be performed.

Figure 9:
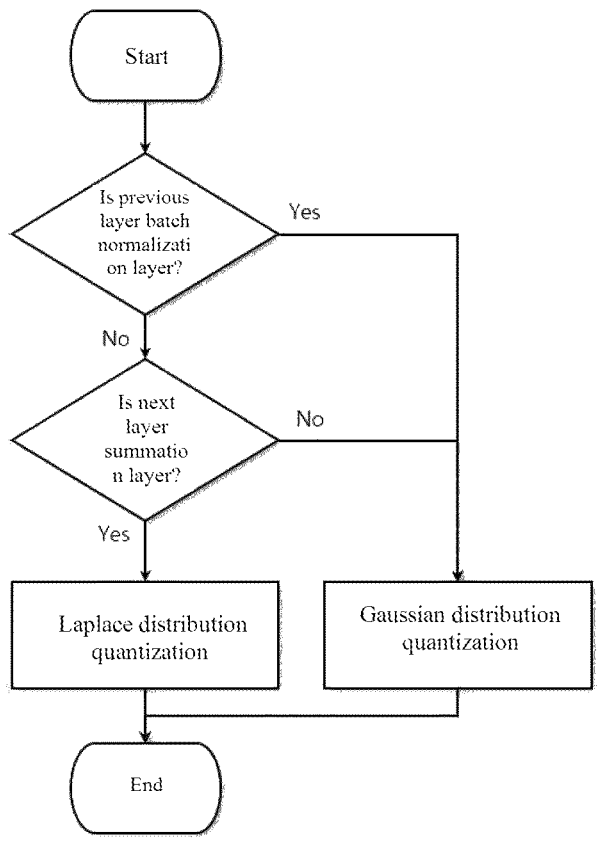
FIG. 9 is a diagram showing a quantization flowchart of a feature map according to an embodiment of the present disclosure.

FIG. 9 is a diagram showing a quantization flowchart of a feature map according to an embodiment of the present disclosure.

This embodiment described by referring to FIG. 9 may be an example of a process performed in a quantization unit. For example, this embodiment may be performed in a quantization unit of a neural network feature map encoding unit described above in FIG. 6.

According to an embodiment of the present disclosure, a quantization unit may confirm whether a previous layer is a batch normalization layer through a neural network feature transmitted from a neural network structure feature extraction unit. Here, a previous layer may mean a layer that a feature map to be currently encoded is generated. When a previous layer is a batch normalization layer, Gaussian distribution quantization may be performed.

Generally, a batch normalization layer performs normalization by learning an average and variance in a batch unit in a learning process, so a feature map after batch normalization may follow Gaussian distribution. Accordingly, when a previous layer is a batch normalization layer, a quantization unit may immediately perform Gaussian distribution quantization.

When a previous layer is not a batch normalization layer, whether a next layer is a summation layer may be confirmed. If it is a summation layer, Laplace distribution quantization may be performed. For a layer other than a summation layer, Gaussian distribution quantization may be performed.

Figure 10:
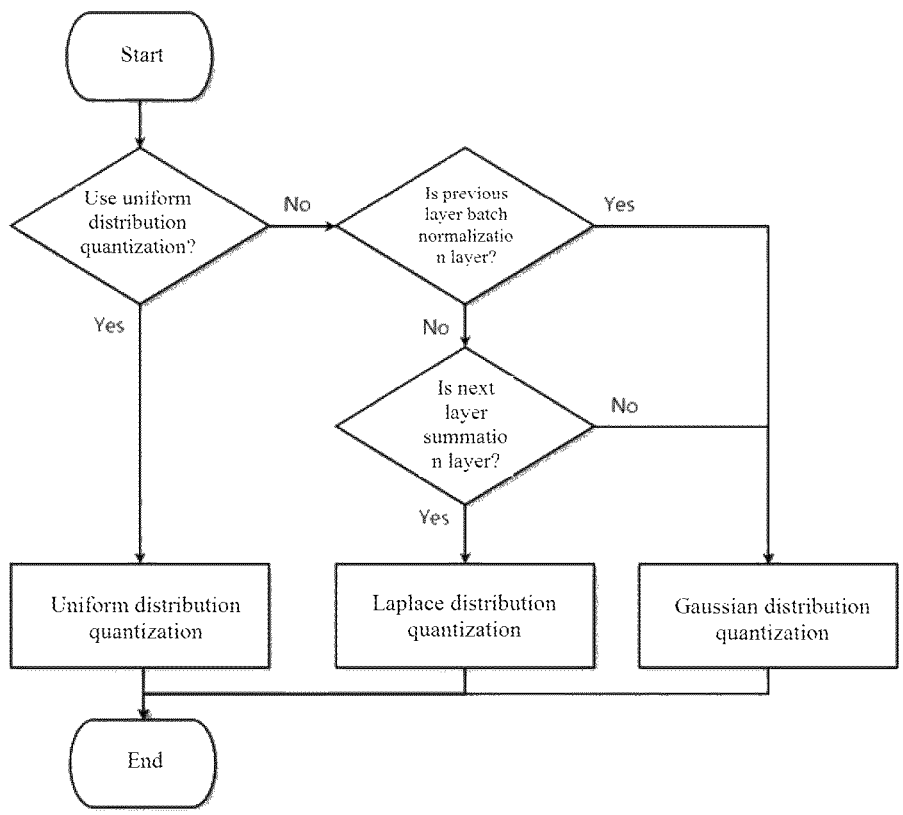
FIG. 10 is a diagram showing a quantization flowchart of a feature map according to an embodiment of the present disclosure.

FIG. 10 is a diagram showing a quantization flowchart of a feature map according to an embodiment of the present disclosure.

This embodiment described by referring to FIG. 10 may be an example of a process performed in a quantization unit. For example, this embodiment may be performed in a quantization unit of a neural network feature map encoding unit described above in FIG. 6.

According to an embodiment of the present disclosure, a quantization unit may confirm whether to use uniform distribution quantization first. In this case, whether to use uniform distribution quantization may be determined by a user's input or a promise of an encoding unit and a decoding unit. Alternatively, it may be determined according to a specific layer index. Determined information on whether to use uniform distribution quantization may be transmitted to a decoder through an entropy encoding unit.

A quantization unit may confirm whether a previous layer is a batch normalization layer through a neural network feature transmitted from a neural network structure feature extraction unit. When uniform distribution quantization is used, uniform distribution quantization may be performed. Otherwise, a quantization unit may confirm whether a previous layer is a batch normalization layer.

When a previous layer is a batch normalization layer, Gaussian distribution quantization may be performed. When a previous layer is not a batch normalization layer, a quantization unit may confirm whether a next layer is a summation layer. If a next layer is a summation layer, Laplace distribution quantization may be performed. When a next layer is a layer other than a summation layer, Gaussian distribution quantization may be performed.

Figure 11:
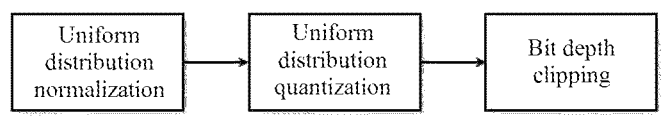
FIG. 11 is a diagram illustrating a uniform distribution quantization process as an embodiment of the present disclosure.
Figure 11:
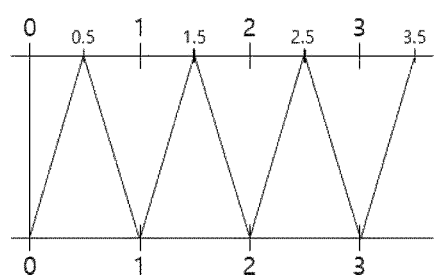

FIG. 11 is a diagram illustrating a uniform distribution quantization process as an embodiment of the present disclosure.

In reference to FIG. 11, when uniform distribution quantization is performed, a quantization unit (or an encoding device, an encoding unit) may perform uniform distribution normalization, uniform distribution quantization, bit depth clipping. Order of steps shown in FIG. 11 may be changed and some steps may be omitted or other steps may be added.

As an embodiment, uniform distribution normalization may be performed as in the following Equation 1.

$$f_{norm} = \left(\frac{f - f_{min}}{f_{max} - f_{min}}\right) \times ((1 \ll bitdepth) - 1) \quad \text{[Equation 1]}$$

Here, f, $f_{min}$, $f_{max}$, $f_{norm}$ may represent a feature map value, a minimum value of a feature map, a maximum value of a feature map, a normalized feature map value, respectively. In other words, when a current feature map follows uniform distribution, a quantization unit may linearly perform normalization by mapping a minimum value of a feature map to 0 and a maximum value to (1<<bitdepth)−1.

Subsequently, a normalized feature map may be subject to uniform distribution quantization through the following Equation 2.

$$\text{level} = \text{floor}\left(\frac{f_{norm} + \text{offset}_U}{Q_{step}}\right) \quad \text{[Equation 2]}$$

Here, $Q_{step}$, level may represent a quantization size, a quantized feature map value, respectively. In addition, floor (_) may represent a rounding-down operation (or function). In this case, $\text{offset}_U$ may be an offset for rounding-off. Alternatively, the above-described variables may be information on a quantization duration boundary suitable for distribution. For example, when $f_{norm}$ is quantized as 3, and $Q_{step}$ is 1 and an offset is 0.5, a quantization duration may be [2.5, 3.5) and 2.5, 3.5 may be a quantization duration boundary. In other words, a quantization duration may be determined by [$f_{norm}$−offset, $f_{norm}$+offset−1].

Next, bit depth clipping may be performed through the following Equation 3.

$$\text{level}_c = \text{Clip3}(0, (1 \ll bitdepth) - 1, \text{level}) \quad \text{[Equation 3]}$$

Here, a Clip3 (min, max, value) function represents a function which receives a minimum value, a maximum value, an input value for clipping as input and outputs an input value or which outputs a minimum value if an input value is smaller than a minimum value and a maximum value if an input value is larger than a maximum value.

Figure 12:
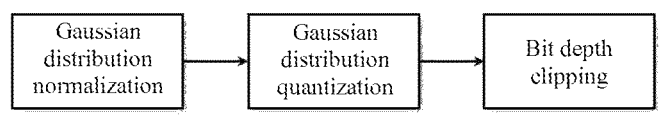
FIG. 12 is a diagram illustrating a Gaussian distribution quantization process as an embodiment of the present disclosure.

FIG. 12 is a diagram illustrating a Gaussian distribution quantization process as an embodiment of the present disclosure.

In reference to FIG. 12, when Gaussian distribution quantization is performed, a quantization unit (or an encoding device, an encoding unit) may perform Gaussian distribution normalization, Gaussian distribution quantization, bit depth clipping. Order of steps shown in FIG. 12 may be changed and some steps may be omitted or other steps may be added.

As an embodiment, Gaussian distribution normalization may be performed as in the following Equation 4.

$$f_{norm} = \left(\frac{f-\mu}{\sigma^2}\right) \times ((1 \ll (bitdepth-1))-1) + ((1 \ll (bitdepth-1))-1) \quad \text{[Equation 4]}$$

Here, f, μ, σ, $f_{norm}$ may represent a feature map value, a feature map average, a feature map variance, a normalized feature map value, respectively.

Subsequently, a normalized feature map may be subject to Gaussian distribution quantization through the following Equation 5.

$$\text{level} = \text{floor}\left(\frac{f_{norm} + \text{offset}_G}{Q_{step}}\right) \quad \text{[Equation 5]}$$

Here, $Q_{step}$, $\text{offset}_G$, level may mean a quantization value, an offset for rounding off, a quantized feature map value, respectively. floor(_) may represent a rounding-down operation (or function). And, $\text{offset}_G$ may be an offset for rounding off. Alternatively, the above-described variables may be information on a quantization duration boundary suitable for distribution.

Next, bit depth clipping may be performed. For example, bit depth clipping may be performed by the above-described Equation 3.

Figure 13:
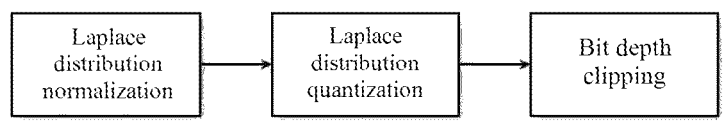
FIG. 13 is a diagram illustrating a Laplace distribution quantization process as an embodiment of the present disclosure.

FIG. 13 is a diagram illustrating a Laplace distribution quantization process as an embodiment of the present disclosure.

In reference to FIG. 13, when Laplace distribution quantization is performed, a quantization unit (or an encoding device, an encoding unit) may perform Laplace distribution normalization, Laplace distribution quantization, bit depth clipping. Order of steps shown in FIG. 13 may be changed and some steps may be omitted or other steps may be added.

As an embodiment, Laplace distribution normalization may be performed as in the following Equation 6.

$$f_{norm} = \left(\frac{f}{\text{scale}}\right) \times ((1 \ll (bitdepth-1))-1) + ((1 \ll (bitdepth-1))-1) \quad \text{[Equation 6]}$$

Here, f, scale, $f_{norm}$ may mean a feature map value, a feature map scale value, a normalized feature map value, respectively.

Subsequently, a normalized feature map may be subject to Laplace distribution quantization through the following Equation 7.

$$\text{level} = \text{floor}\left(\frac{f_{norm} + \text{Offset}_L}{Q_{step}}\right) \quad \text{[Equation 7]}$$

Here, Qstep, level may mean a quantization size, a quantized feature map value, respectively. In addition, floor (_) may mean a rounding-down operation (or function). offsetG may be an offset for rounding off. Alternatively, the above-described variables may be information on a quantization duration boundary suitable for distribution.

Next, bit depth clipping may be performed. For example, bit depth clipping may be performed by the above-described Equation 3.

Figure 14:
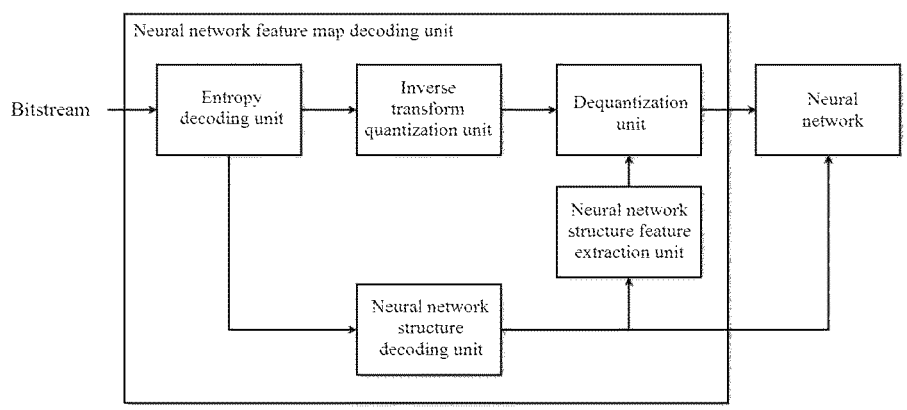
FIG. 14 shows a neural network feature map decoding unit decoding a feature map of a neural network as an embodiment of the present disclosure.

FIG. 14 shows a neural network feature map decoding unit decoding a feature map of a neural network as an embodiment of the present disclosure.

In reference to FIG. 14, a neural network feature map decoding unit may decode a feature map of a neural network. As an example, a neural network feature map decoding unit may include an entropy decoding unit, an inverse transform quantization unit (or an inverse transform unit), a dequantization unit, a neural network structure decoding unit, a neural network structure feature extraction unit. A configuration of a neural network feature map decoding unit shown in FIG. 14, as an example, may be implemented to omit some configurations or further include other configurations.

As an embodiment, a neural network feature map decoding unit may reconstruct a feature map and/or a neural network by decoding a bitstream transmitted from an encoding unit. In this case, a reconstructed neural network may be the entire multiple neural networks or a partial neural network. Alternatively, it may be the entire neural network after a layer that a transmitted feature map is generated.

An entropy decoding unit may decode an input bitstream to generate a transform-quantized feature map and transmit it to an inverse transform quantization unit. And, a symbolized neural network structure may be reconstructed and transmitted to a neural network structure decoding unit. An inverse transform quantization unit may dequantize and inversely transform a transform-quantized feature map and transmit it to a dequantization unit.

A neural network structure decoding unit may decode a symbolized neural network structure transmitted from an entropy decoding unit to reconstruct a neural network structure. A reconstructed neural network structure may be transmitted to a neural network structure feature extraction step and a neural network structure feature extraction step may be the same as a step included in a neural network feature map encoding unit.

A neural network structure feature extraction unit may extract a variety of information such as the entire neural network structure, order of layers, an index of a layer, a type before or after a current feature map, etc. from a reconstructed neural network structure and transmit it to a dequantization unit. A dequantization unit may perform dequantization adaptively or selectively through a transmitted inversely transform-quantized (or inversely transformed) feature map and a feature of a neural network structure. Here, a dequantization step may transform a data form of a feature map according to a form of data used in a neural network subsequently.

If a neural network is based on an integer-type operation, it may be reconstructed into an integer type in a dequantization unit and if it is a floating point-based neural network, it may be reconstructed based on a floating point. A reconstructed feature map may be input of a neural network.

Figure 15:
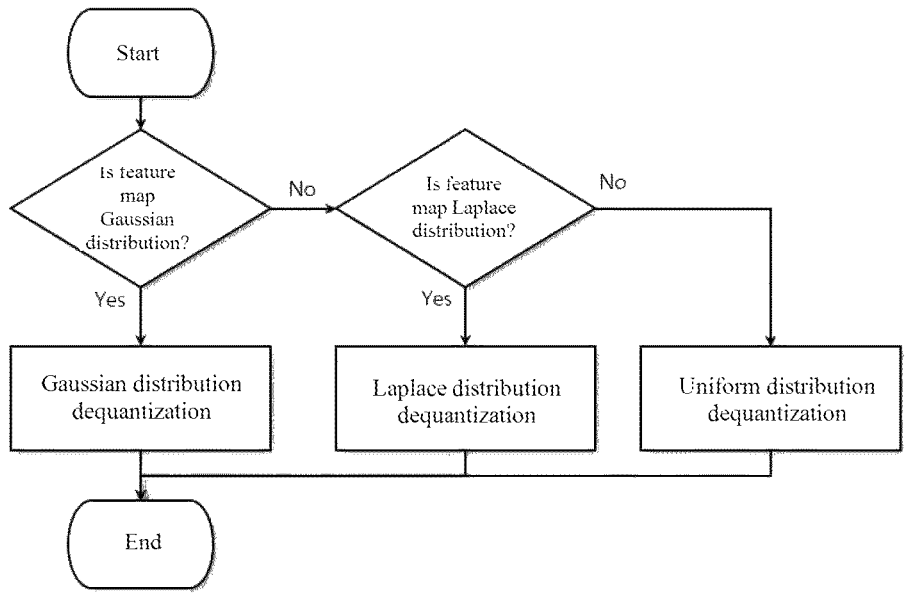
FIG. 15 is a diagram showing a flowchart of dequantization of a feature map according to an embodiment of the present disclosure.

FIG. 15 is a diagram showing a dequantization flowchart of a feature map according to an embodiment of the present disclosure.

This embodiment described by referring to FIG. 15 may be an example of a process performed in a dequantization unit. For example, this embodiment may be performed in a dequantization unit of a neural network feature map decoding unit described above in FIG. 14.

As an embodiment, a dequantization unit may receive information on whether distribution of a current feature map follows Gaussian distribution or Laplace distribution from an entropy decoding unit. When it follows Gaussian distribution, Gaussian distribution dequantization may be performed. Otherwise, a dequantization unit may additionally confirm whether it follows Laplace distribution.

When it follows Laplace distribution, Laplace distribution quantization may be performed and otherwise, uniform distribution quantization may be performed.

Figure 16:
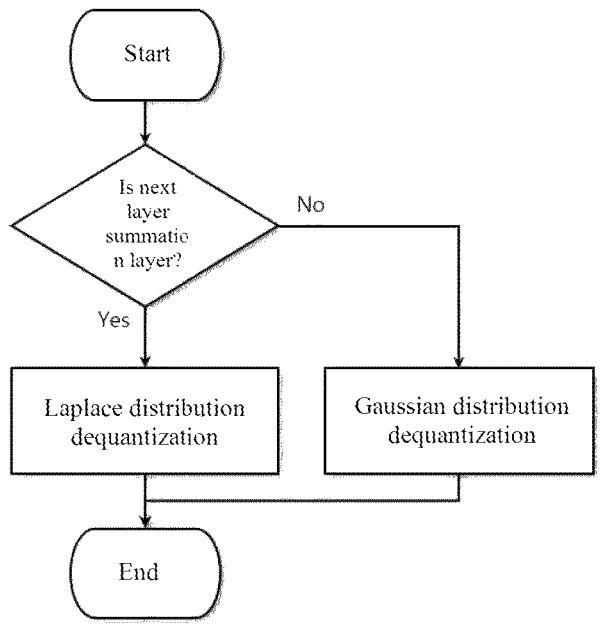
FIG. 16 is a diagram showing a flowchart of dequantization of a feature map according to an embodiment of the present disclosure.

FIG. 16 is a diagram showing a dequantization flowchart of a feature map according to an embodiment of the present disclosure.

This embodiment described by referring to FIG. 16 may be an example of a process performed in a dequantization unit. For example, this embodiment may be performed in a dequantization unit of a neural network feature map decoding unit described above in FIG. 14.

As an embodiment, a dequantization unit may confirm whether a next layer is a summation layer through a neural network feature transmitted from a neural network structure feature extraction unit. When a next layer is a summation layer, Laplace distribution dequantization may be performed. For a layer other than a summation layer, Gaussian distribution dequantization may be performed.

Figure 17:
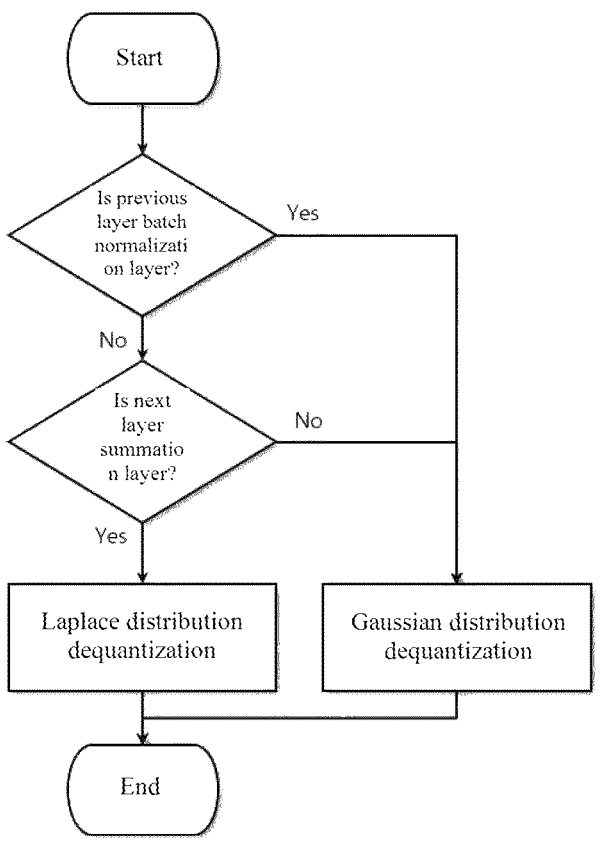
FIG. 17 is a diagram showing a flowchart of dequantization of a feature map according to an embodiment of the present disclosure.

FIG. 17 is a diagram showing a dequantization flowchart of a feature map according to an embodiment of the present disclosure.

This embodiment described by referring to FIG. 17 may be an example of a process performed in a dequantization unit. For example, this embodiment may be performed in a dequantization unit of a neural network feature map decoding unit described above in FIG. 14.

As an embodiment, a dequantization unit may confirm whether a previous layer is a batch normalization layer through a neural network feature transmitted from a neural network structure feature extraction unit. Here, a previous layer may mean a layer that a feature map to be currently encoded is generated. When a previous layer is a batch normalization layer, Gaussian distribution dequantization may be performed.

When a previous layer is not a batch normalization layer, a dequantization unit may confirm whether a next layer is a summation layer. For a summation layer, Laplace distribution dequantization may be performed. For a layer other than a summation layer, Gaussian distribution dequantization may be performed.

Figure 18:
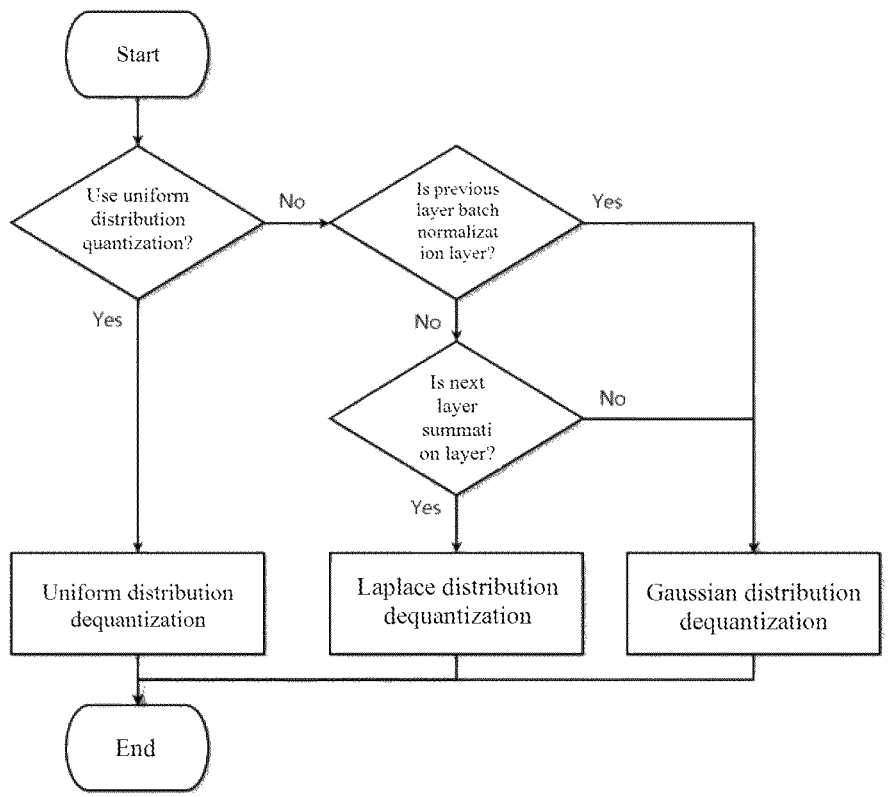
FIG. 18 is a diagram showing a flowchart of dequantization of a feature map according to an embodiment of the present disclosure.

FIG. 18 is a diagram showing a dequantization flowchart of a feature map according to an embodiment of the present disclosure.

This embodiment described by referring to FIG. 18 may be an example of a process performed in a dequantization unit. For example, this embodiment may be performed in a dequantization unit of a neural network feature map decoding unit described above in FIG. 14.

As an embodiment, a dequantization unit may confirm whether to use uniform distribution dequantization first. In this case, whether to use uniform distribution quantization may be transmitted through an entropy decoding unit. Alternatively, it may be determined by a promise of an encoding unit and a decoding unit. Alternatively, it may be determined according to a specific layer index.

A dequantization unit may confirm whether a previous layer is a batch normalization layer through a neural network feature transmitted from a neural network structure feature extraction unit. When uniform distribution dequantization is used, uniform distribution dequantization may be performed and otherwise, a dequantization unit may confirm whether a previous layer is a batch normalization layer.

When a previous layer is a batch normalization layer, Gaussian distribution dequantization may be performed. When a previous layer is not a batch normalization layer, a dequantization unit may confirm whether a next layer is a summation layer. For a summation layer, Laplace distribution dequantization may be performed. For a layer other than a summation layer, Gaussian distribution dequantization may be performed.

Figure 19:
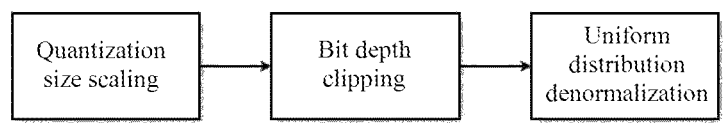
FIG. 19 is a diagram illustrating a uniform distribution dequantization process as an embodiment of the present disclosure.

FIG. 19 is a diagram illustrating a uniform distribution dequantization process as an embodiment of the present disclosure.

In reference to FIG. 19, when uniform distribution dequantization is performed, a dequantization unit (or a decoding device, a decoding unit) may perform a process of quantization size scaling, bit depth clipping, uniform distribution denormalization. Order of steps shown in FIG. 19 may be changed and some steps may be omitted or other steps may be added.

As an embodiment, quantization size scaling may be performed through the following Equation 8.

$$f_{dq} = \text{level} \times Q_{\text{step}} \quad \text{[Equation 8]}$$

Here, level, $Q_{step}$, $f_{dq}$ may mean a quantized feature value, a quantization size, a dequantized feature value, respectively.

For a dequantized feature value, bit depth clipping may be applied through the following Equation 9.

$$f'_{dq} = \text{Clip3}(0, (1 \ll \text{bitdepth}) - 1, f_{dq}) \quad \text{[Equation 9]}$$

For a clipped feature value, uniform distribution denormalization may be applied through the following Equation 10.

$$f = \left(\frac{f'_{dq}}{(1 \ll \text{bitdepth}) - 1}\right) \times (f_{max} - f_{min}) + f_{min} \quad \text{[Equation 10]}$$

Here, f, $f_{min}$, $f_{max}$ may mean a reconstructed feature map value, a minimum value of a feature map, a maximum value of a feature map, respectively. In this case, $f_{min}$, $f_{max}$ may be transmitted from an encoding unit through an entropy decoding unit.

Figure 20:
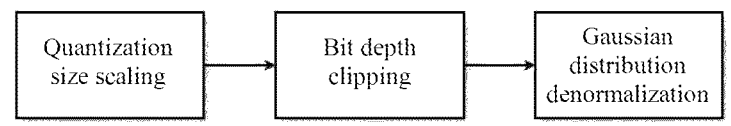
FIG. 20 is a diagram illustrating a Gaussian distribution dequantization process as an embodiment of the present disclosure.

FIG. 20 is a diagram illustrating a Gaussian distribution dequantization process as an embodiment of the present disclosure.

In reference to FIG. 20, when Gaussian distribution dequantization is performed, a dequantization unit (or a decoding device, a decoding unit) may perform a process of quantization size scaling, bit depth clipping, Gaussian distribution denormalization. Order of steps shown in FIG. 20 may be changed and some steps may be omitted or other steps may be added.

As an embodiment, quantization size scaling may be performed through the following Equation 11.

$$f_{dq} = \text{level} \times Q_{\text{step}} \quad \text{[Equation 11]}$$

Here, level, $Q_{step}$, $f_{dq}$ may mean a quantized feature value, a quantization size, a dequantized feature value, respectively.

For a dequantized feature value, bit depth clipping may be applied through the following Equation 12.

$$f'_{dq} = \text{Clip3}(0, (1 \ll \text{bitdepth}) - 1, f_{dq}) \quad \text{[Equation 12]}$$

For a clipped feature value, uniform distribution denormalization may be applied through the following Equation 13.

$$f = \left(\frac{f'_{dq}}{(1 \ll bitdepth) - 1} - 1\right) \times \sigma^2 + \mu \qquad \text{[Equation 13]}$$

f, μ, σ may mean a reconstructed feature map value, a feature map average, a feature map variance value, respectively. In this case, μ, σ may be transmitted from an encoding unit through an entropy decoding unit.

Figure 21:
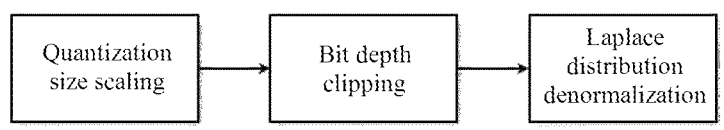
FIG. 21 is a diagram illustrating a Laplace distribution dequantization process as an embodiment of the present disclosure.

FIG. 21 is a diagram illustrating a Laplace distribution dequantization process as an embodiment of the present disclosure.

In reference to FIG. 21, when Laplace distribution dequantization is performed, a dequantization unit (or a decoding device, a decoding unit) may perform a process of quantization size scaling, bit depth clipping, Laplace distribution denormalization. Order of steps shown in FIG. 21 may be changed and some steps may be omitted or other steps may be added.

As an embodiment, quantization size scaling may be performed through the following Equation 14.

$$f_{dq} = \text{level} \times Q\text{step} \qquad \text{[Equation 14]}$$

Here, level, $Q_{step}$, $f_{dq}$ may mean a quantized feature value, a quantization size, a dequantized feature value, respectively.

And, for a dequantized feature value, bit depth clipping may be applied through the following Equation 15.

$$f'_{dq} = \text{Clip3}(0, (1 \ll bitdepth) - 1, f_{dq}) \qquad \text{[Equation 15]}$$

Subsequently, a clipped feature value may be subject to uniform distribution denormalization through the following Equation 16.

$$f = \left(\frac{f'_{dq}}{(1 \ll bitdepth) - 1} - 1\right) \times \text{scale} \qquad \text{[Equation 16]}$$

Here, f, scale may mean a reconstructed feature map value, a feature map scale value, respectively. In this case, scale may be transmitted from an encoding unit through an entropy decoding unit.

Figure 22:
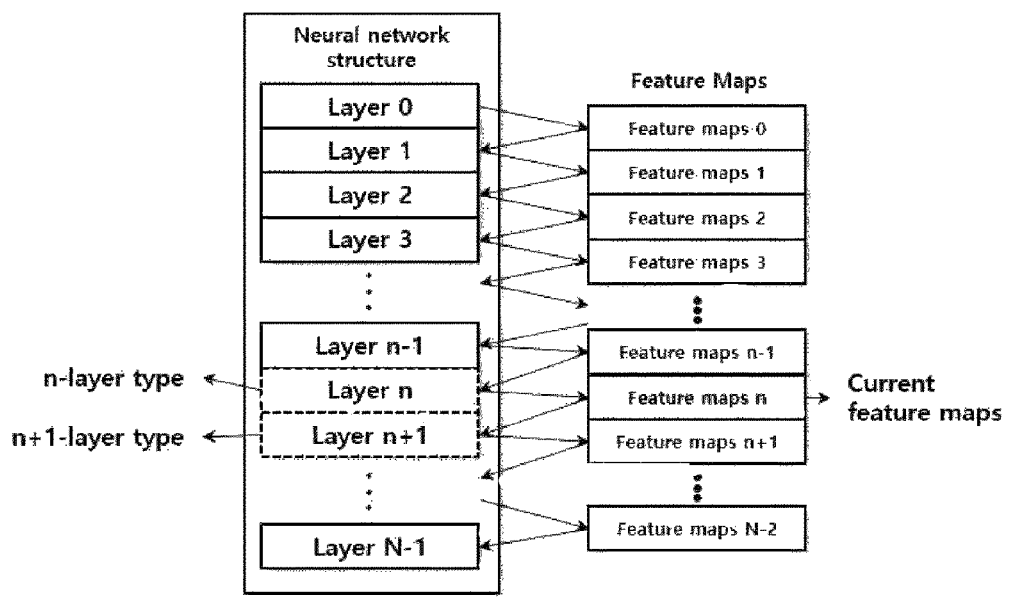
FIG. 22 is a diagram for describing a neural network structure extracted through a neural network structure feature extraction unit as an embodiment of the present disclosure.

FIG. 22 is a diagram for describing a neural network structure extracted through a neural network structure feature extraction unit as an embodiment of the present disclosure.

In an embodiment of the present disclosure, a neural network structure feature extraction unit may be a neural network structure feature extraction unit described in FIG. 6 and FIG. 14. As described above, a neural network structure may be extracted through a neural network structure feature extraction unit and an extracted feature may be used for a feature map encoding process.

As an embodiment, a neural network may have N layers and when data is input, a feature map may be generated in all layers excluding a last layer. In this case, N−1 feature maps or less may be generated. Each layer may be of a different type. In addition, a layer in a specific type pattern may be consecutively connected. For example, a convolution layer, an offset summation layer and an activation layer may be repeatedly connected. Here, a type of a layer may be at least one of a convolution layer, an offset summation layer, a sampling layer, a batch normalization layer, an activation layer, a summation layer, a pooling layer.

Figure 23:
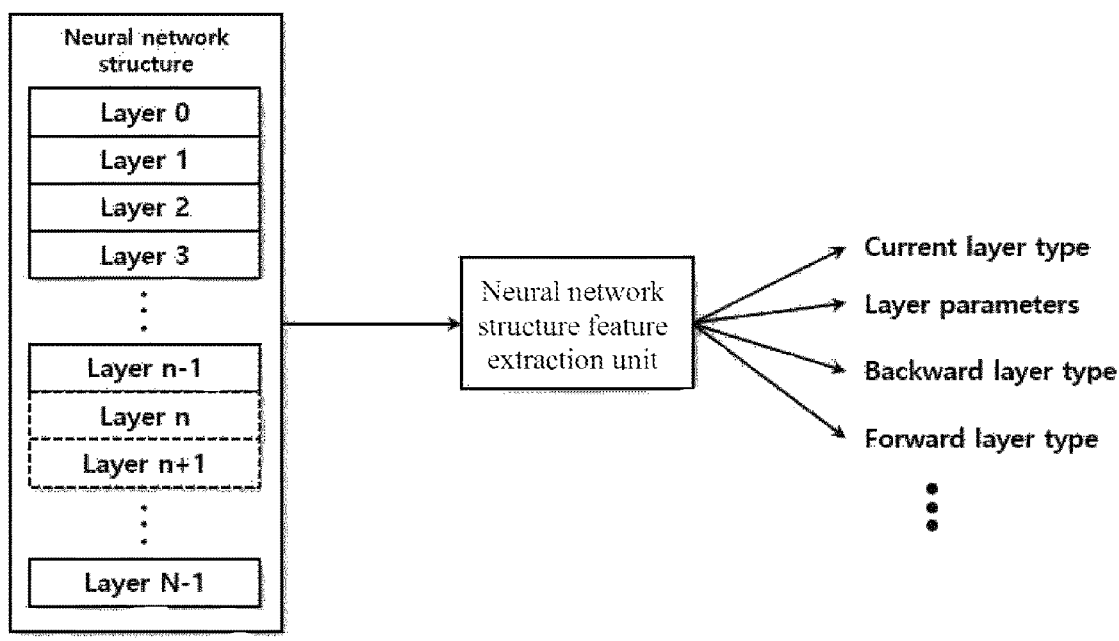
FIG. 23 is a diagram conceptually showing an example of various information that a neural network structure is used as input of a neural network structure feature extraction unit and is output through a neural network structure feature extraction unit as an embodiment of the present disclosure.

FIG. 23 is a diagram conceptually showing an example of various information that a neural network structure is used as input of a neural network structure feature extraction unit and is output through a neural network structure feature extraction unit as an embodiment of the present disclosure.

In this embodiment, a neural network structure may be a neural network structure described above in FIG. 22. A neural network structure feature extraction unit may be a neural network structure feature extraction unit described in FIG. 6 and FIG. 14. A neural network structure extraction unit, for an input neural network structure, may extract a type of a n-th layer that a current feature map is output or a n+1-th layer that a current feature map is input.

And, a neural network structure extraction unit may confirm whether a type of a n-th layer is a batch normalization layer. When it is a batch normalization layer, an encoding unit may transmit a parameter used for batch normalization to a quantization layer. Alternatively, a decoding unit may transmit batch normalization parameters to a dequantizer.

A neural network structure extraction unit may confirm whether a type of a n+1-th layer is a summation layer. When it is a summation layer, information on whether it is a summation layer may be transmitted to a quantization unit or a dequantization unit. In addition, a summation type and a layer index for order of a layer to be summed may be transmitted to a quantization unit. For example, a summation layer may be at least one of an addition layer or a concatenation layer.

In an embodiment of the present disclosure, a method and a device of quantizing a feature map adaptively through feature map analysis for efficient compression of a feature map of a neural network are proposed. In more detail, a quantization method and device of determining importance of a feature map channel for efficient feature map compression and differently applying a quantization size according to importance are proposed.

A feature map, an interim result of a neural network, may mean a different feature per channel. In addition, each feature may also have a different effect on a final prediction predicted through a neural network. Accordingly, channels of a feature map are classified into channels with a large impact on a final prediction and channels with a small impact and a quantization size is adaptively adjusted per channel by using a classification result, improving encoding efficiency of feature map compression.

Figure 24:
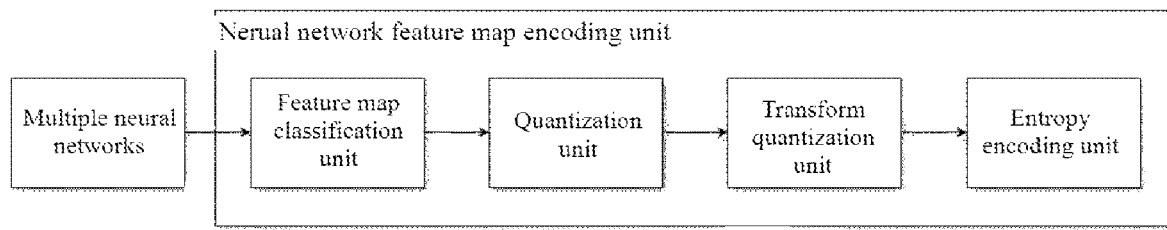
FIG. 24 is a diagram illustrating a neural network feature map encoding unit encoding a feature map of a neural network as an embodiment of the present disclosure.

FIG. 24 is a diagram illustrating a neural network feature map encoding unit encoding a feature map of a neural network as an embodiment of the present disclosure.

In reference to FIG. 24, a neural network feature map encoding unit may encode a feature map of a neural network generated from multiple neural networks. As an example, a neural network feature map encoding unit may include a feature map classification unit, a quantization unit, a transform quantization unit (or a transform unit), an entropy encoding unit, a neural network structure feature extraction unit, a neural network structure encoding unit. A configuration of a neural network feature map encoding unit shown in FIG. 24, as an example, may be implemented to omit some configurations or further include other configurations. In describing this embodiment, a part overlapped with the description in FIG. 6 is omitted.

Multiple neural networks may be configured with a plurality of neural networks and each neural network may be connected in series or in parallel. Alternatively, for one data, some of multiple neural network structures may be connected in series and others may be connected in parallel. A feature map, an interim result (or output), may be generated in a consecutive neural network connection.

When a neural network is connected in series, one feature map may be generated. And, when a neural network is connected in parallel, one or more feature maps may be generated. The plurality of feature maps may have the same size or a different size, respectively.

As an embodiment, at least one feature map, a result (or an interim result) of multiple neural networks, may be compressed through a neural network feature map encoding unit and transmitted to a decoding unit or stored in a storage device. A feature map classification unit may classify an input feature map and transmit a classified feature map to a quantization unit. And, classification information generated in a feature map classification unit may be transmitted to a decoder through an entropy encoding unit.

Here, classification information may be a classification index according to a channel of a feature map, a classification index according to a spatial position, a classification index for a spatial mask, etc. Feature maps classified in a feature map classification unit may be transmitted to a quantization unit. A quantization unit may individually quantize an input classified feature map according to a classification index and generate a quantized feature map. A generated quantized feature map may be transmitted to a transform quantization unit.

A transform quantization unit may perform transform quantization (or transform) to encode a transmitted quantized feature map. Here, quantization in transform quantization may mean quantization for rate control. A transform quantization unit may reconfigure a feature map per classification index to transform it into two-dimensional data or may transform a form into one-dimensional data. Alternatively, frequency domain transform used for general image or video encoding may be applied. A coefficient quantized for rate control after transform into a frequency domain may be transmitted to an entropy encoding unit.

Figure 25:
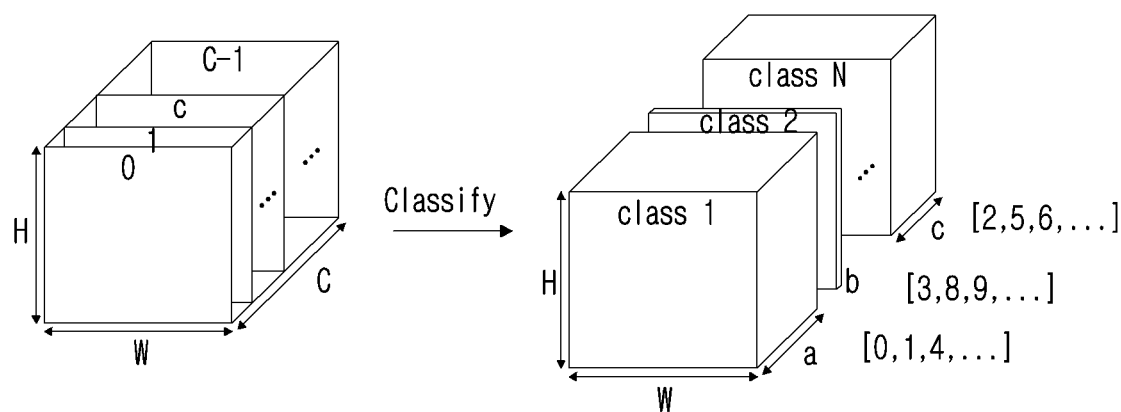
FIG. 25 is a diagram illustrating a feature map classification unit according to an embodiment of the present disclosure.

FIG. 25 is a diagram illustrating a feature map classification unit according to an embodiment of the present disclosure.

In reference to FIG. 25, a feature map may have a size of (width H, height W, channel C). Such a feature map may be classified by a feature map classification unit into N classes. A feature map classification unit may be a configuration described above in FIG. 24. In addition, a feature map classification unit may store and manage a channel index of an original tensor per class in a form of a list. In addition, channel index information may be transmitted to a decoder through an entropy encoding unit for quantization and dequantization.

As an embodiment, a feature map classification unit may classify a feature map by using inter-channel similarity in classifying a feature map per channel. Since most feature maps extract a feature value while maintaining a spatial and structural feature of an input image, there may be a set of channels that a size of a feature value per channel is different, but inter-channel similarity is high.

Accordingly, a feature map classification unit may classify channels by using a deep learning-based classification method or a machine learning-based classification method such as a k-means algorithm using inter-channel similarity. In this case, the number of classifications according to a used algorithm may be equal. Alternatively, each class may have a different number and in this case, number information per each list may be transmitted to a decoder.

Figure 26:
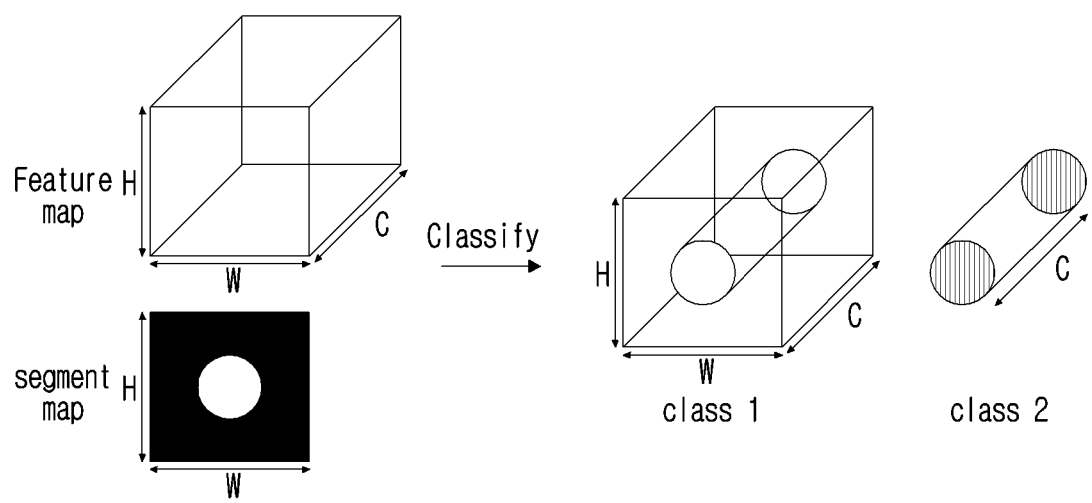
FIG. 26 is a diagram illustrating a feature map classification unit according to an embodiment to which the present disclosure is applied.

FIG. 26 is a diagram illustrating a feature map classification unit according to an embodiment to which the present disclosure is applied.

In reference to FIG. 26, a feature map having a size of (width, height, channel) may be classified as a class by classifying a specific spatial region. Classified position information may be transmitted to a decoder through entropy encoding in a form like a class index map. A feature map classification unit may perform classification in an input image or video, reflect a classification result on a feature and apply a classification result to the same position.

In addition, since a spatial resolution of an input image and a feature map may be different, a feature map classification unit may reflect a resolution difference by changing into the same resolution through resampling. Alternatively, a feature map may be classified in a unit of a block having a specific size. When classified in a unit of a block, partition information, a partition depth, a class index, etc. of a block may be transmitted to a decoder through an entropy encoding unit.

Figure 27:
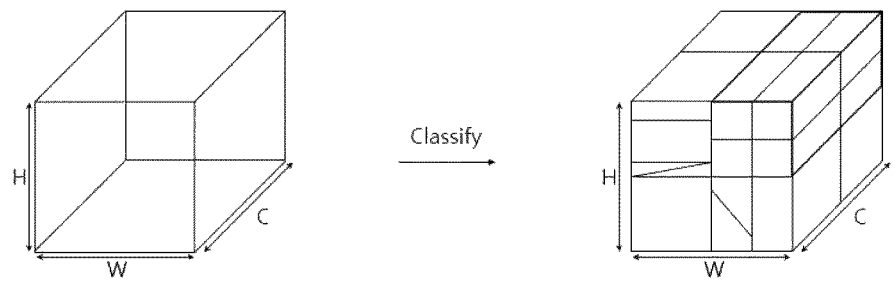
FIG. 27 is a diagram illustrating a feature map classification unit according to an embodiment to which the present disclosure is applied.

FIG. 27 is a diagram illustrating a feature map classification unit according to an embodiment to which the present disclosure is applied.

In reference to FIG. 27, a feature map having a size of (width, height, channel) may be classified as a class by classifying a specific spatial region. Classified position information may be transmitted to a decoder through entropy encoding in a form like a class index map. A feature map classification unit may perform classification in an input image or video, reflect a classification result on a feature and apply a classification result to the same position.

A feature map classification unit may spatially partition a feature map into blocks and classify a feature map by mapping a class index for each block. For block partition, partition may be performed into 4, 2 or 3 parts. In addition, diagonal partition may be performed and a result of diagonal partition may be also referred to as one block. Alternatively, a feature map may be partitioned in various directions including partitioning three-dimensional data itself into 8 parts, 4 parts, etc. Block partition may be partitioned into multiple layers. Partition information, a partition depth, a class index, etc. of a block may be transmitted to a decoder through an entropy encoding unit.

Figure 28:
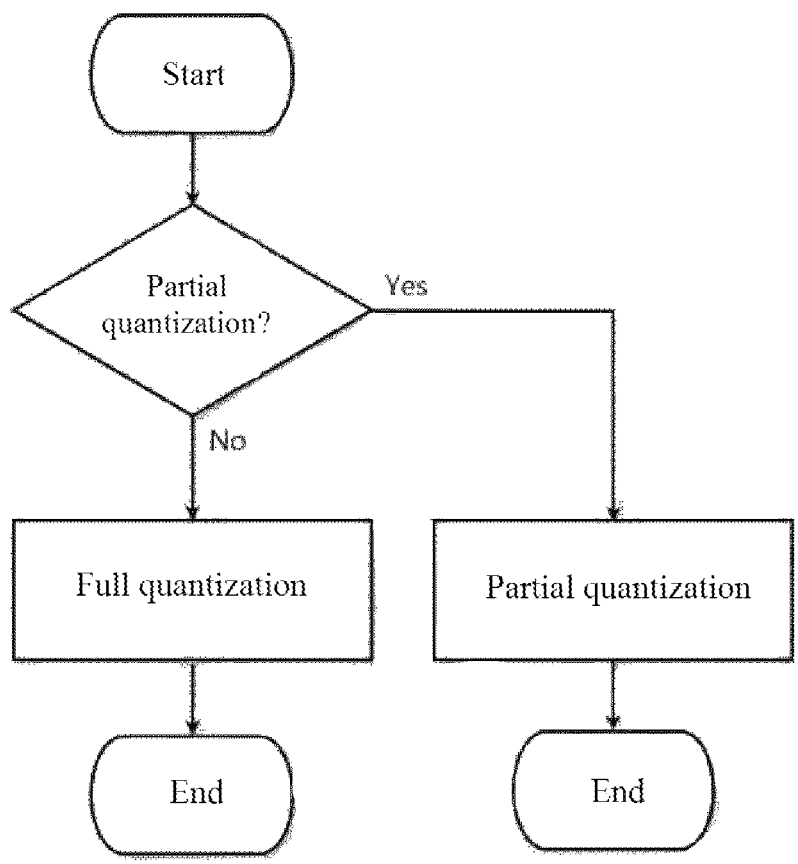
FIG. 28 is a diagram showing a quantization flowchart of a feature map according to an embodiment of the present disclosure.

FIG. 28 is a diagram showing a quantization flowchart of a feature map according to an embodiment of the present disclosure.

This embodiment described by referring to FIG. 28 may be an example of a process performed in a quantization unit. For example, this embodiment may be performed in a quantization unit of a neural network feature map encoding unit described above in FIG. 24.

According to an embodiment of the present disclosure, a quantization unit may determine whether to perform partial quantization and perform full quantization or partial quantization according to a determination result. As an example, a determination on whether to perform partial quantization may be input from a user. Alternatively, a quantization unit may determine whether to perform partial quantization according to a function of a neural network. For example, when a function of a neural network has a function of partitioning an image or a video, a quantization unit may perform partial quantization. Alternatively, when a function of a neural network has a function of predicting a position of an object in an image or a video, partial quantization may be performed.

Alternatively, when a function of a neural network has a function of tracking an object in a video, partial quantization may be performed. Information on whether to perform partial quantization may be transmitted to a decoder through an entropy encoding unit. Alternatively, when information on a function of a neural network is transmitted, a determination may be made through neural network function information in an encoder and a decoder, respectively. Alternatively, a quantization method may be predefined in an encoder and a decoder according to a function of a neural network.

Figure 29:
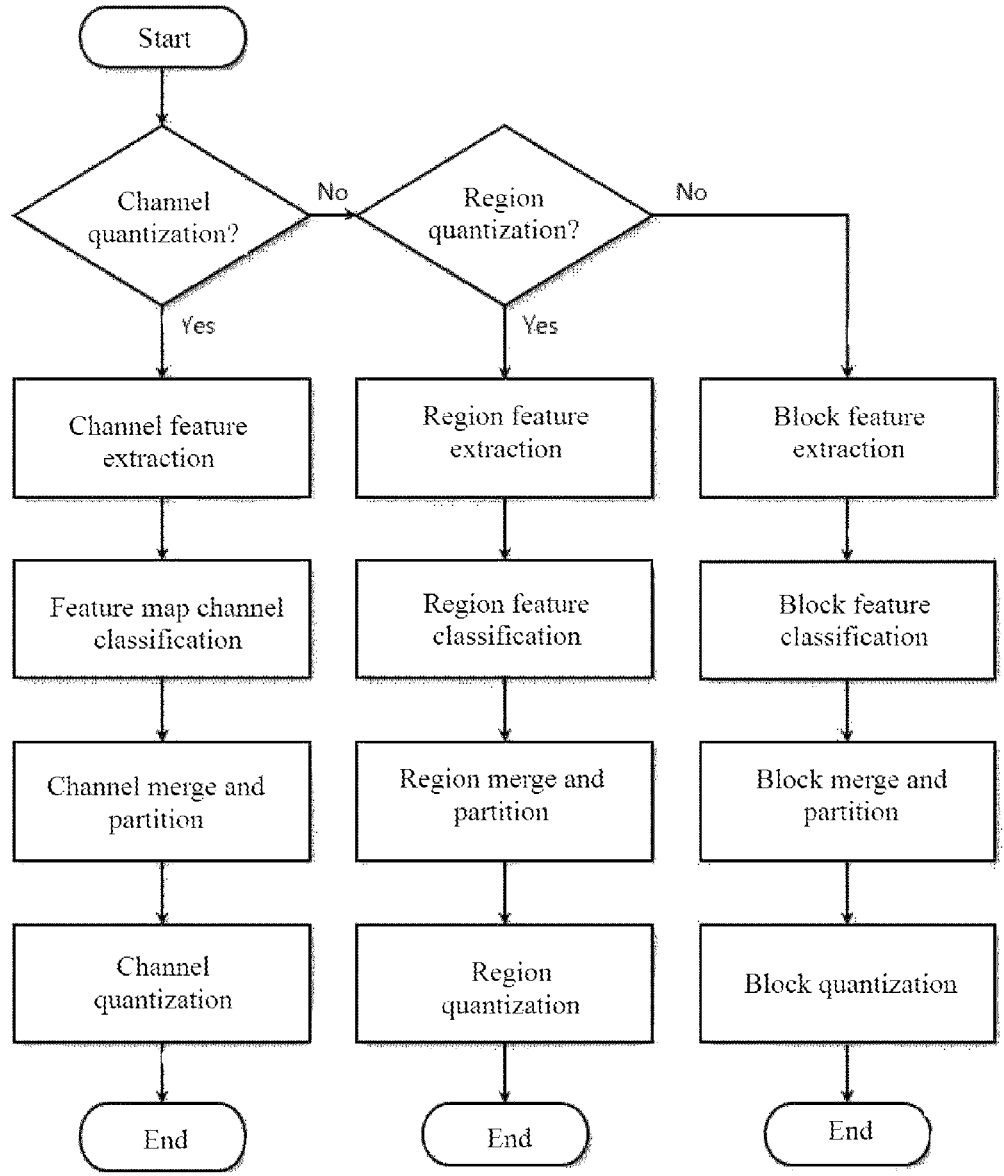
FIG. 29 is a diagram showing a partial quantization flowchart of a feature map according to an embodiment of the present disclosure.

FIG. 29 is a diagram showing a partial quantization flowchart of a feature map according to an embodiment of the present disclosure.

This embodiment described by referring to FIG. 29 may be an example of a process performed in a quantization unit. For example, this embodiment may be performed in a quantization unit of a neural network feature map encoding unit described above in FIG. 24.

As an embodiment, a quantization unit may confirm whether to perform channel quantization. Information on whether to perform may be input from an encoder user. Alternatively, information on whether to perform may be determined by information determined in a higher step. Here, information on whether to perform channel quantization may be transmitted to a decoder through an entropy encoding unit.

As an embodiment, when channel quantization is performed, channel feature extraction may be performed. In a channel feature extraction step, a quantization unit may extract an inter-channel feature of a feature map. In this case, an inter-channel feature may be an average value of values included in a channel. Alternatively, an inter-channel feature may be a variance value. Alternatively, an inter-channel feature may be a feature extracted through other neural network. Alternatively, an inter-channel feature may be structural complexity. An extracted feature may be transmitted to a feature map channel classification step.

As an embodiment, channels may be classified by using features transmitted from a feature map channel classification step. The number of classified classes may be equal to or smaller than the number of channels of the existing feature map. In a feature map channel classification step, feature map channels may be classified based on similarity of features per channel. At least one feature extracted per channel may be combined into an one-dimensional vector and may be classified into K classes through a classification algorithm such as a k-means algorithm based on similarity between channel feature vectors. And, classified channel information may be transmitted to a channel merge and partition step.

In a channel merge and partition step, when the number of channels included in one class is too small, encoding efficiency may be reduced, so at least one class may be merged with other class to configure one class. Alternatively, when too many channels are included in one class, channel partition may be performed.

Finally configured channel information per class may be transmitted to a channel quantization step. In a channel quantization step, feature map quantization may be performed by applying a different quantization method according to a class classified in the step. In this case, a different quantization method may represent that a quantization step is different. Alternatively, a different quantization method may represent that a bit depth of a quantized value is different. Alternatively, a different quantization method may represent that a different nonlinear mapping function is used for quantization. When it is determined that channel quantization is not performed in a step of confirming whether to perform channel quantization, whether to perform region quantization may be confirmed.

Information on whether to perform region quantization may be input from an encoder user. Alternatively, information on whether to perform region quantization may be determined by information determined in a higher step. Here, information on whether to perform channel quantization may be transmitted to a decoder through an entropy encoding unit.

When it is determined that region quantization is performed, a region feature extraction step may be performed. when it is determined that region quantization is not performed, a block feature extraction step may be performed for block quantization. In a region feature extraction step, a quantization unit may extract a feature per spatial position from an input feature map and transmit extracted features to a region feature classification step. In a region feature classification step, a quantization unit may classify a region based on input spatial features. In this case, a classified region may be shared and used in all channels of a feature map. And, classified regions may be transmitted to a region merge and partition step.

As an embodiment, in a region merge and partition step, merge and partition may be performed for partitioned regions based on the number of classes, a size, a width or a height of a region, the number of pixels, etc. and a final region may be determined. Finally determined regions may be transmitted to a region quantization step. In addition, in a region quantization step, a different quantization method may be applied according to a transmitted classified region. In a block feature extraction step, features may be extracted in a unit of a specific block size from a transmitted feature map. In this case, a block may mean a cube, data in a three-dimensional space, and may be referred to as a tensor. In other words, a block may be unit data obtained by partitioning a feature map into smaller units.

Next, extracted features may be transmitted to a block feature classification step. In a block feature classification step, a quantization unit may classify blocks by using features of a transmitted unit block. Merge and partition may be performed into blocks having a different width, height and depth by using classified classes. Here, partition information of merged and partitioned blocks may be transmitted to a decoder through an entropy encoding unit. In this case, partition information may exist hierarchically and may be partitioned into a variety of tree structures such as 8 partitions, 4 partitions, 2 partitions, etc.

Alternatively, class information of merged and partitioned blocks may be transmitted to a decoder through an entropy encoding unit in a form of a classification map. In this case, values of a classification map may mean an index of a class. And, for entropy encoding, a quantization unit may use surrounding blocks of a current block to encode an index difference between a prediction value and a current block and transmit it to an entropy encoding unit.

Finally, a different quantization method may be applied by using class information in a unit of a block having a variety of sizes. Here, a different quantization method may represent that a quantization size is different. Alternatively, a variety of methods such as an offset value, a scale value, vector quantization, scalar quantization, etc. may be applied per class. Information related to a quantization method per each class may be transmitted to a decoder through an entropy encoding unit.

Figure 30:
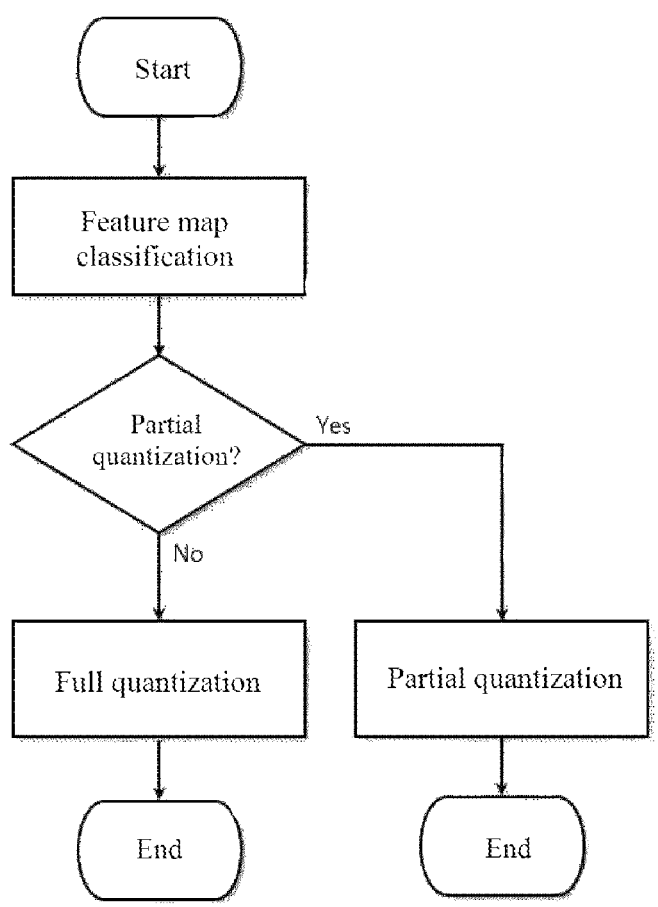
FIG. 30 is a diagram showing a partial quantization flowchart of a feature map according to an embodiment of the present disclosure.

FIG. 30 is a diagram showing a partial quantization flowchart of a feature map according to an embodiment of the present disclosure.

This embodiment described by referring to FIG. 30 may be an example of a process performed in a quantization unit.

For example, this embodiment may be performed in a quantization unit of a neural network feature map encoding unit described above in FIG. 24. A method described above in FIG. 28 and FIG. 29 may be applied to this embodiment and a related overlapping description is omitted.

As an embodiment, a quantization unit may classify an input feature map and use a classified feature map to extract one or more information on a quantization method. Here, information on whether to perform partial quantization may be included in extracted information. When partial quantization is not used, full quantization may be performed. Otherwise, partial quantization may be performed. Partial quantization-related information may be transmitted to a decoder through an entropy encoding unit.

Figure 31:
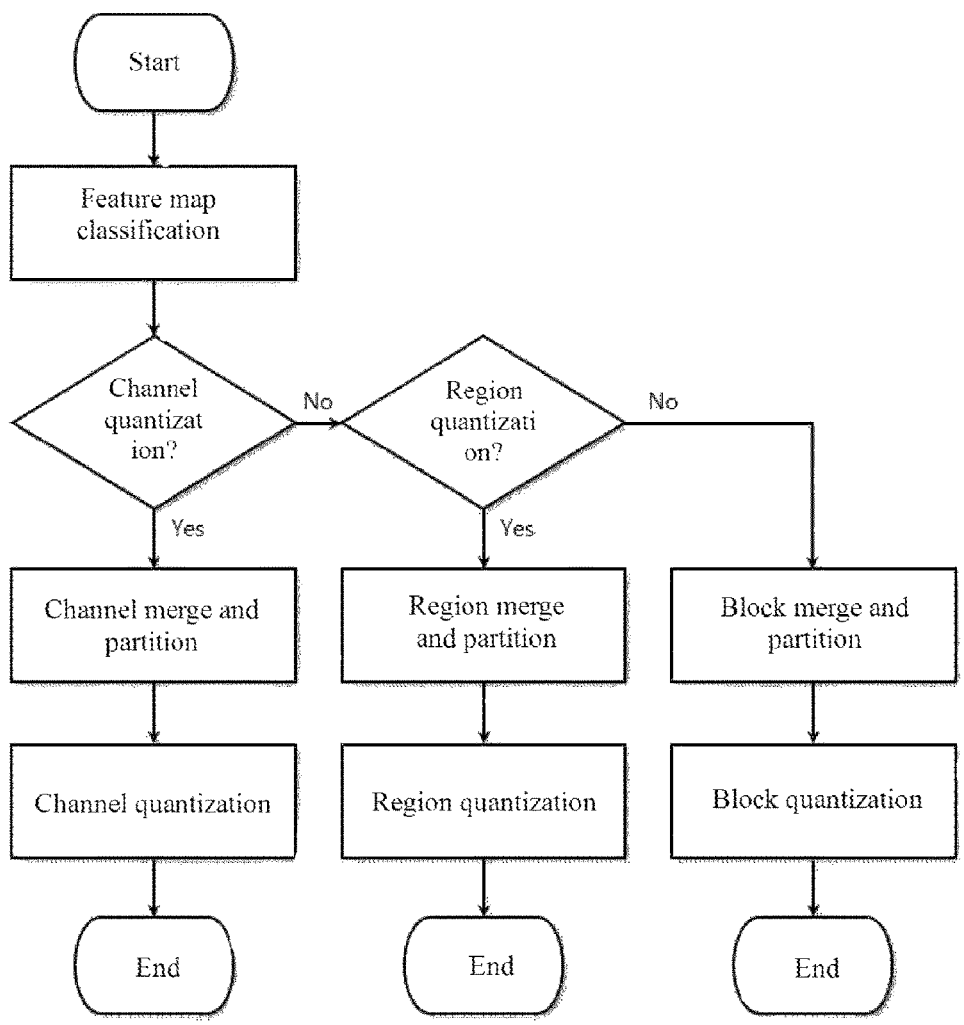
FIG. 31 is a diagram showing a partial quantization flowchart of a feature map according to an embodiment of the present disclosure.

FIG. 31 is a diagram showing a partial quantization flowchart of a feature map according to an embodiment of the present disclosure.

This embodiment described by referring to FIG. 31 may be an example of a process performed in a quantization unit. For example, this embodiment may be performed in a quantization unit of a neural network feature map encoding unit described above in FIG. 24. A method described above in FIG. 28 to FIG. 30 may be applied to this embodiment and a related overlapping description is omitted.

As an embodiment, an input feature map may be classified and a classified feature map may be used to extract one or more information on a quantization method. Here, information on whether to perform channel quantization may be included in extracted information. When information on channel quantization is included, features per channel may be additionally included.

In addition, information on whether to perform region quantization may be included in extracted information. If region quantization is performed, information on features for a spatial region may be included. A quantization unit may perform region merge and partition by using features for a region.

In addition, when region quantization is not performed, features in a unit of a block may be included and block merge and partition may be performed by using it. Information on block partition may be transmitted to a decoder through an entropy encoding unit.

Figure 32:
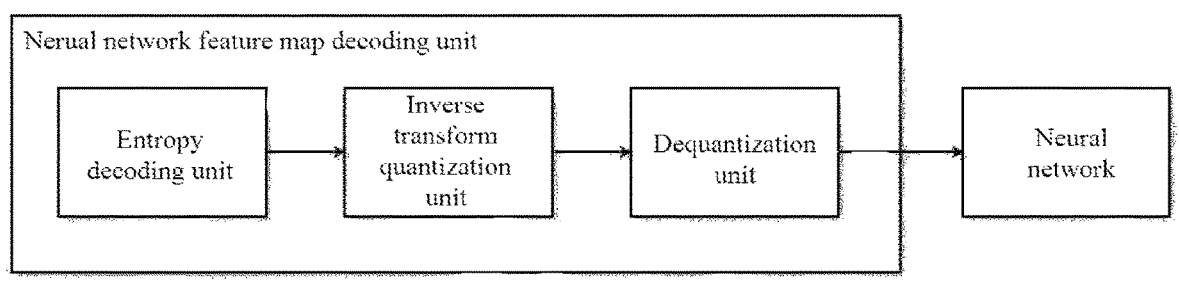
FIG. 32 shows a block diagram of a neural network feature map decoding unit according to an embodiment of the present disclosure.

FIG. 32 shows a block diagram of a neural network feature map decoding unit according to an embodiment of the present disclosure.

In reference to FIG. 32, a neural network feature map decoding unit may decode a feature map of a neural network. As an example, a neural network feature map decoding unit may include an entropy decoding unit, an inverse transform quantization unit (or an inverse transform unit), a feature map partition unit, a dequantization unit. A configuration of a neural network feature map decoding unit shown in FIG. 32, as an example, may be implemented to omit some configurations or further include other configurations.

As an embodiment, a neural network feature map decoding unit may decode a bitstream transmitted from an encoder to generate a reconstructed feature map. Here, a neural network may be a neural network used by a promise between an encoder and a decoder. Alternatively, a neural network may be all or part of a neural network reconstructed through an encoder/a decoder.

An entropy decoding unit may decode an input bitstream, reconstruct a transform-quantized feature map and transmit it to an inverse transform quantization unit. In addition, an entropy decoding unit may reconstruct feature map classification information and transmit it to an inverse transform quantization unit and a dequantization unit. An inverse transform quantization unit may dequantize and inversely transform a transform-quantized feature map and transmit it to a dequantization unit.

A dequantization unit may perform individual dequantization according to classification through classification information transmitted from an entropy decoding unit. A dequantized feature map may be finally transmitted to a neural network.

Figure 33:
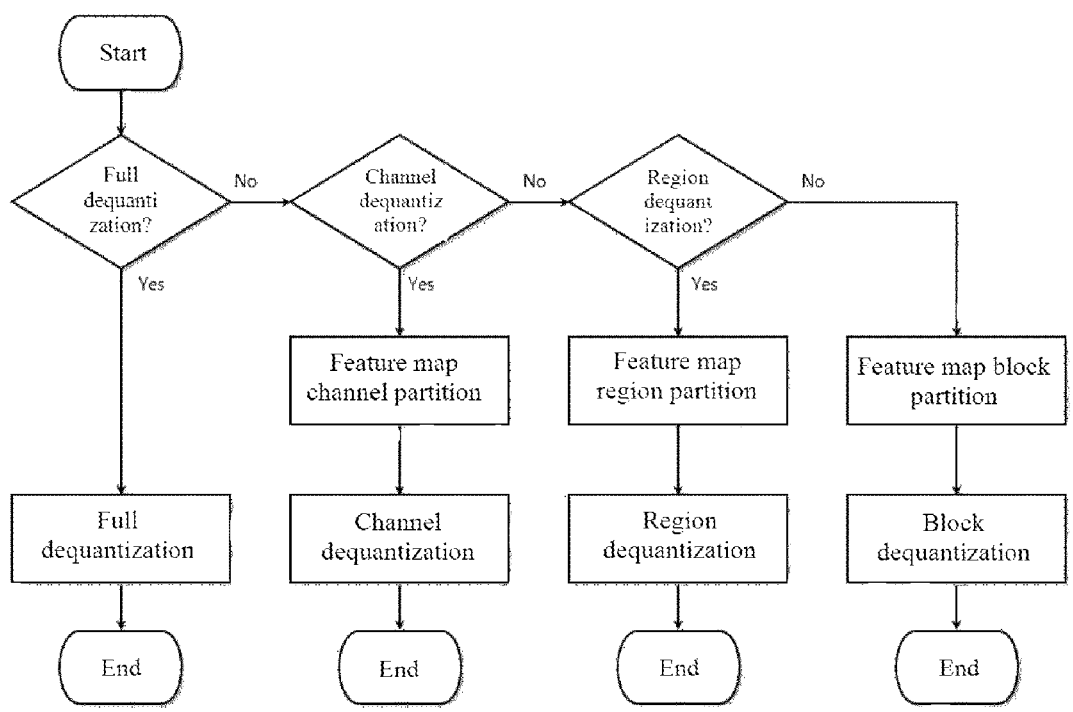
FIG. 33 is a diagram showing a flowchart of dequantization of a feature map according to an embodiment of the present disclosure.

FIG. 33 is a diagram showing a dequantization flowchart of a feature map according to an embodiment of the present disclosure.

This embodiment described by referring to FIG. 33 may be an example of a process performed in a dequantization unit. For example, this embodiment may be performed in a dequantization unit of a neural network feature map decoding unit described above in FIG. 32.

As an embodiment, a dequantization unit may receive information related to a transmitted feature map and a dequantization method from an entropy decoder. In this case, dequantization-related information may include information on whether to perform full dequantization. In addition, dequantization-related information may include information on whether to perform channel dequantization. In this case, when information on whether to perform channel dequantization is included, dequantization-related information may additionally include information additionally related to feature map classification per channel and in this case, it may include information related to a quantization step, an offset, etc. used for dequantization.

In addition, dequantization-related information may include information on whether to perform region dequantization. In this case, when information on whether to perform region dequantization is included, information which is additionally used for region partition may be additionally included. For example, it may be transmitted through an entropy decoder from an encoding unit in a form of a classification map. In addition, information related to a quantization step, an offset, etc. used for dequantization may be included.

First, a dequantization unit may confirm whether to perform full dequantization. When it is determined that full dequantization is performed, full dequantization may be performed. Full dequantization may perform the same dequantization method for all feature maps. In this case, a quantization step, an offset, a scaling value, etc. required for dequantization may be transmitted from an entropy decoder. Alternatively, a predetermined set may be used according to a value transmitted from an entropy decoder.

If it is determined that full dequantization is not performed, dequantization-related information may confirm whether to perform channel dequantization. When it is determined that channel dequantization is performed, a feature map may be transmitted to a feature map channel partition step. In a feature map channel partition step, a dequantization unit may partition a channel through transmitted channel partition information and transmit a partitioned feature map to a channel dequantization step.

When it is determined that channel dequantization is not performed, a dequantization unit may confirm whether to perform region dequantization. When it is determined that region dequantization is performed, a transmitted feature map may be transmitted to a feature map region partition step. In a feature map region partition step, a dequantization unit may partition a feature map into a plurality of regions by using a transmitted feature map and region partition information transmitted from an entropy encoding unit. And, a partitioned feature map may be transmitted to a region dequantization step.

In addition, in a region dequantization step, a dequantization unit may perform a different quantization method per each region. When it is determined that region dequantization is not performed, a feature map block partition step may be performed. In a feature map block partition step, a dequantization unit may partition a feature map into various sizes and forms through block partition information transmitted from an entropy decoding unit and receive class information per each block to apply a quantization method according to a class.

Embodiments described above may be a combination of components and features of the present disclosure in a predetermined form. Each component or feature should be considered selective unless explicitly stated otherwise. Each component or feature may be implemented in a form which is not combined with other component or feature. In addition, some components and/or features may be combined to configure an embodiment of the present disclosure. Order of operations described in embodiments of the present disclosure may be changed. Some configurations or features of an embodiment may be included in other embodiment or may be replaced with a configuration or a feature corresponding to other embodiment. It is obvious that claims without an explicit citation relationship in a scope of claims may be combined to configure an embodiment or may be included as a new claim by amendment after application.

An embodiment according to the present disclosure may be implemented by a variety of means, for example, hardware, firmware, software, or a combination thereof, etc. For implementation by hardware, an embodiment of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, micro controllers, micro processors, etc.

In addition, for implementation by firmware or software, an embodiment of the present disclosure may be implemented in a form of a module, a procedure, a function, etc. performing functions or operations described above and may be recorded in a readable recoding medium through a variety of computer means. Here, a recording medium may include a program instruction, a data file, a data structure, etc. alone or in combination. A program instruction recorded in a recording medium may be those specially designed and configured for the present disclosure or those available by being notified to a person skilled in computer software. For example, a recording medium includes magnetic media such as a hard disk, a floppy disk and a magnetic tape, optical media such as CD-ROM (Compact Disk Read Only Memory) and DVD (Digital Video Disk), magneto-optical media such as a floptical disk and a hardware device which is specially configured to store and perform a program instruction such as ROM, RAM, a flash memory, etc. An example of a program instruction may include a high-level language code which may be executed by a computer by using an interpreter, etc. as well as a machine language code like what is made by a compiler. Such a hardware device may be configured to operate as at least one software module to perform an operation of the present disclosure and vice versa.

In addition, a device or a terminal according to the present disclosure may be driven by a command which causes at least one processor to perform functions and processes described above. For example, such a command may include, for example, an interpreted command like a script command such as a JavaScript or ECMAScript command, etc. or other commands stored in a computer readable medium readable or an executable code. Further, a device according to the present disclosure may be implemented in a distributed way across a network such as Server Farm or may be implemented in a single computer device.

In addition, a computer program which comes with a device according to the present disclosure and executes a method according to the present disclosure (also known as a program, software, a software application, a script or a code) may be written in any form of a programming language including a compiled or interpreted language or a priori or procedural language and may be deployed in any form including a stand-alone program, module, component or subroutine or other units suitable for use in a computer environment. A computer program does not necessarily correspond to a file of a file system. A program may be stored in a single file provided for a requested program, or in multiple interacting files (e.g., a file storing part of at least one module, subprogram or code), or in part of a file owning other program or data (e.g., at least one script stored in a markup language document). A computer program may be positioned in one site or distributed across a plurality of sites and may be deployed to be executed on one computer or multiple computers interconnected by a communication network.

It is obvious to a person skilled in the art that the present disclosure may be implemented in other specific form without departing from an essential feature of the present disclosure. Accordingly, the above-described detailed description should not be interpreted restrictively in all respects and should be considered illustrative. A scope of the present disclosure should be determined by reasonable interpretation of attached claims and all changes within an equivalent scope of the present disclosure are included in a scope of the present disclosure.

INDUSTRIAL AVAILABILITY

The present disclosure may be used for a neural network based quantization method and device.

The invention claimed is:

1. A neural network based video signal processing method, the method comprising:
   generating a feature map by using multiple neural networks including a plurality of neural networks; and
   performing quantization on the feature map,
   wherein the quantization is performed based on an attribute of the feature map or a structure of the multiple neural networks, and
   wherein a structure of the multiple neural networks includes at least one of whether the multiple neural networks are connected in series, whether the multiple neural networks are connected in parallel, whether the multiple neural networks are connected in series and in parallel, or a type of a layer adjacent to a current layer that the feature map is generated.

2. The method according to claim 1,
   wherein the attribute of the feature map includes a distribution type of sample values in the feature map, and
   wherein the quantization is performed by a quantization method mapped to the distribution type.

3. The method according to claim 2,
wherein the distribution type includes at least one of an uniform distribution, a Gaussian distribution or a Laplace distribution.

4. The method according to claim 2, wherein performing the quantization comprises,
performing normalization on sample values in the feature map by a normalization method mapped to the distribution type.

5. The method according to claim 1,
wherein the quantization is performed by a quantization method mapped to the type of the adjacent layer, and
wherein the type of the layer includes at least one of a batch normalization layer or a summation layer.

6. The method according to claim 1,
wherein classifying the feature map into a plurality of classes is further included, and
wherein the attribute of the feature map includes a class of the feature map.

7. The method according to claim 6,
wherein the feature map includes a plurality of channels, and
wherein the feature map is classified into the plurality of classes including at least one channel based on a similarity between the plurality of channels.

8. The method according to claim 6,
wherein the feature map is spatially classified based on a spatial similarity of an input image.

9. A neural network based video signal processing device, the device comprising:
a processor which controls the video signal processing device; and
a memory which is combined with the processor and stores data,
wherein the processor is configured to:
generate a feature map by using multiple neural networks including a plurality of neural networks, and
perform quantization on the feature map,
wherein the quantization is performed based on an attribute of the feature map or a structure of the multiple neural networks, and
wherein a structure of the multiple neural networks includes at least one of whether the multiple neural networks are connected in series, whether the multiple neural networks are connected in parallel, whether the multiple neural networks are connected in series and in parallel, or a type of a layer adjacent to a current layer that the feature map is generated.

\* \* \* \* \*